United States Patent
Vanderpool et al.

(10) Patent No.: US 11,966,786 B2
(45) Date of Patent: Apr. 23, 2024

(54) PROXY-BASED INSTRUCTION THROTTLING CONTROL

(71) Applicant: International Business Machines Corporation, Armonk, NY (US)

(72) Inventors: Brian Thomas Vanderpool, Byron, MN (US); Gregory Scott Still, Raleigh, NC (US); Juan Medina, Rochester, MN (US); Michael Stephen Floyd, Cedar Park, TX (US); Matthew A. Cooke, Cedar Park, TX (US)

(73) Assignee: International Business Machines Corporation, Armonk, NY (US)

( * ) Notice: Subject to any disclaimer, the term of this patent is extended or adjusted under 35 U.S.C. 154(b) by 476 days.

(21) Appl. No.: 17/460,162

(22) Filed: Aug. 28, 2021

(65) Prior Publication Data
US 2023/0068471 A1    Mar. 2, 2023

(51) Int. Cl.
*G06F 9/44*      (2018.01)
*G06F 1/3234*    (2019.01)
*G06F 1/324*     (2019.01)
*G06F 9/50*      (2006.01)

(52) U.S. Cl.
CPC .......... *G06F 9/5044* (2013.01); *G06F 1/324* (2013.01); *G06F 1/3243* (2013.01)

(58) Field of Classification Search
CPC ................................... G06F 1/32; G06F 9/44
See application file for complete search history.

(56) References Cited

U.S. PATENT DOCUMENTS

| | | | |
|---|---|---|---|
| 8,214,663 B2 | 7/2012 | Floyd | |
| 8,635,483 B2 | 1/2014 | Acar | |
| 9,141,167 B2 * | 9/2015 | Conrad | ................ G06F 1/3206 |
| 10,409,354 B2 | 9/2019 | Tagata | |
| 2006/0288241 A1 | 12/2006 | Felter | |
| 2008/0263373 A1 | 10/2008 | Meier | |
| 2013/0151869 A1 | 6/2013 | Steinman | |
| 2016/0048188 A1 | 2/2016 | Kim | |

(Continued)

OTHER PUBLICATIONS

Cebrian et al., "Managing Power Constraints in a Single-Core Scenario Through Power Tokens," The Journal of Supercomputing 68, No. 1, 2014, pp. 414-442.

(Continued)

*Primary Examiner* — Keshab R Pandey
(74) *Attorney, Agent, or Firm* — Richard B. Thomas

(57) ABSTRACT

Embodiments relate to a system and method for managing energy consumption of one or more processor cores in a multicore processing device. The method includes establishing a temporal interval that includes a plurality of temporal periods and an interval energy target for one or more processor cores. The method also includes determining for each temporal period a period energy target for the processor cores and determining a processor core throttling state for the processor cores. The method further includes adjusting the respective period energy target and the respective processor core throttling state at the beginning of each successive temporal period. The method also includes converging, subject to the adjusting, as each respective temporal period of the plurality of temporal periods is concluded, a total period energy consumption of the processor cores with the interval energy target.

20 Claims, 14 Drawing Sheets

(56) References Cited

U.S. PATENT DOCUMENTS

2019/0041942 A1   2/2019  Keceli
2019/0086982 A1   3/2019  Priyadarshi
2019/0369694 A1  12/2019  Diamand
2020/0272217 A1*  8/2020  Becker .................. G06F 1/3234

OTHER PUBLICATIONS

Jayaseelan et al., "A Hybrid Local-Global Approach for Multi-Core Thermal Management," ICCAD 2009, ACM, Nov. 2-5, 2009, 7 pages.
List of IBM Patents or Patent Applications Treated as Related, Aug. 27, 2021, 2 pages.
Liu et al., "FastCap: An Efficient and Fair Algorithm for Power Capping in Many-Core Systems," 2016 IEEE International Symposium on Performance Analysis of Systems and Software (ISPASS), Mar. 3, 2016, pp. 57-68.
Shen et al., "Power Containers: An OS Facility for Fine-Grained Power and Energy Management on Multicore Servers," ASPLOS '13, ACM, 2013, 12 pages.
Tavana et al., "ElasticCore: A Dynamic Heterogeneous Platform With Joint Core and Voltage/Frequency Scaling," IEEE Transactions on Very Large Scale Integration (VLSI) Systems 26, No. 2, 2017, pp. 249-261.
Vanderpool et al., "Current Prediction-Based Instruction Throttling Control," U.S. Appl. No. 17/460,163, filed Aug. 28, 2021.

* cited by examiner

PROXY-BASED INSTRUCTION THROTTLING CONTROL

BACKGROUND

The present disclosure relates to energy management of one or more processor cores, and, more specifically, to managing energy consumption of the one or more processor cores through digital power proxy data and the respective energy consumption determinations.

Many known modern processing devices include multiple cores that are powered through a steady-state power source. As the processing loads on the cores vary, the supply voltage to the cores may dip, i.e., droop as a result of increased loading on one or more of the cores, thereby creating an environment conducive to microarchitectural processor stall events.

SUMMARY

A system and method are provided for energy management of one or more processor cores.

In one aspect, a computer system is provided for energy management of one or more processor cores. The system includes a power state general purpose engine (PGPE) operably coupled to the one or more processor cores. The PGPE is configured to establish a temporal interval and establish a plurality of temporal periods within the temporal interval. The system also includes a hardware-based control loop operably coupled to the one or more processor cores and the PGPE. The hardware-based control loop is configured to determine, for the temporal interval, an interval energy target for the at least one processor core of the one or more processor cores. The hardware-based control loop is also configured to determine, for a first temporal period of the plurality of temporal periods, a period energy target for the least one processor core of the one or more processor cores. The hardware-based control loop is further configured to determine, for the first temporal period of the plurality of temporal periods, a processor core throttling state for the at least one processor core of the one or more processor cores. The hardware-based control loop is also configured to adjust, at the beginning of each successive temporal period of the plurality of temporal periods, the respective period energy target and the respective processor core throttling state. The hardware-based control loop is further configured to converge, subject to the adjustment, as each respective temporal period of the plurality of temporal periods is concluded, a total period energy consumption of the at least one processor core of the one or more processor cores with the interval energy target.

In yet another aspect, a computer-implemented method is provided for energy management of one or more processor cores management of one or more processor cores. The method includes establishing a temporal interval, where the temporal interval includes a plurality of temporal periods. The method also includes determining, for the temporal interval, an interval energy target for at least one processor core of the one or more processor cores. The method further includes determining, for a first temporal period of the plurality of temporal periods, a period energy target for the least one processor core of the one or more processor cores. The method also includes determining, for the first temporal period of the plurality of temporal periods, a processor core throttling state for the at least one processor core of the one or more processor cores. The method further includes adjusting, at the beginning of each successive temporal period of the plurality of temporal periods, the respective period energy target and the respective processor core throttling state. The method also includes converging, subject to the adjusting, as each respective temporal period of the plurality of temporal periods is concluded, a total period energy consumption of the at least one processor core of the one or more processor cores with the interval energy target.

The present Summary is not intended to illustrate each aspect of every implementation of, and/or every embodiment of the present disclosure. These and other features and advantages will become apparent from the following detailed description of the present embodiment(s), taken in conjunction with the accompanying drawings.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are illustrative of certain embodiments and do not limit the disclosure.

Figure 1:
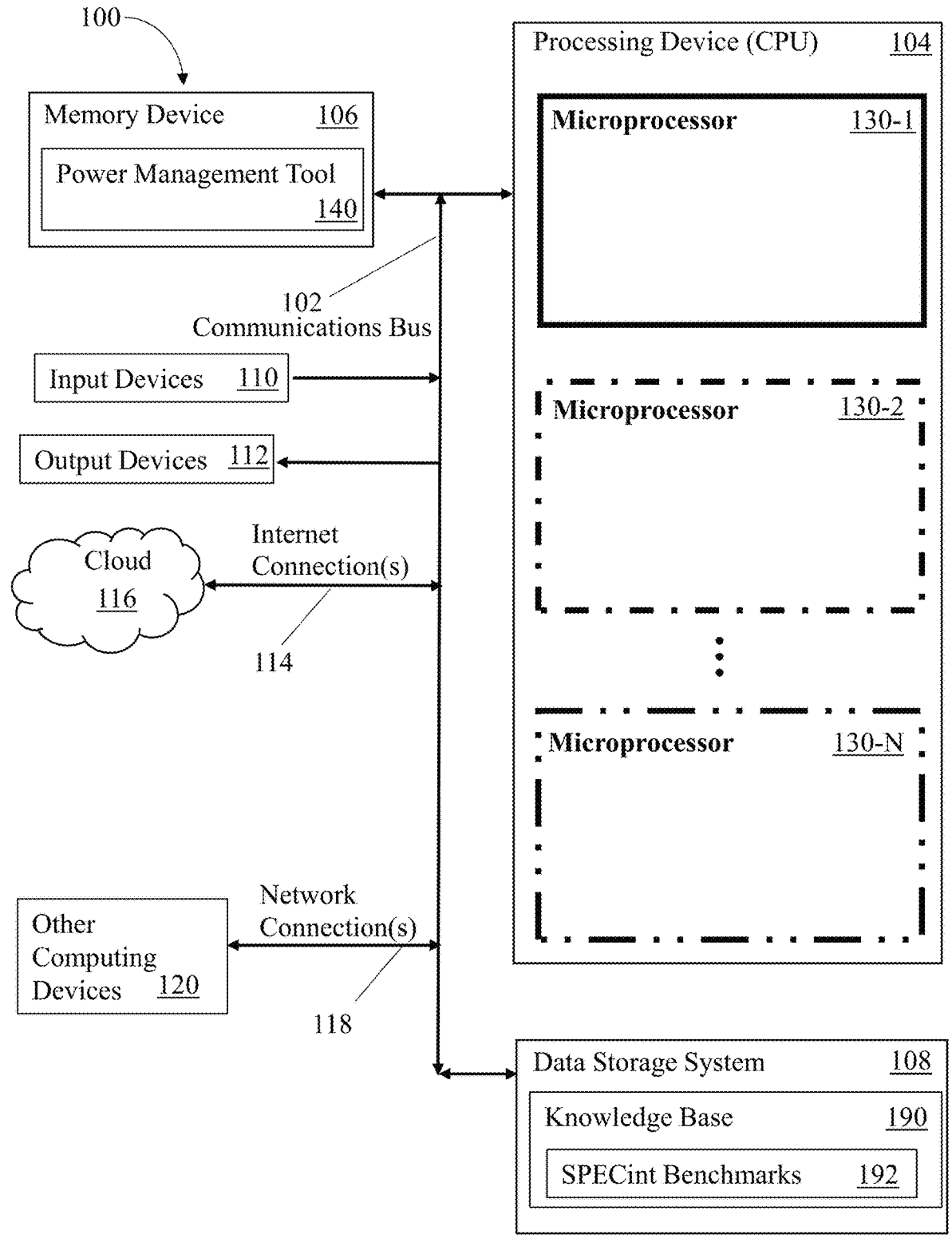
FIG. 1 is a block schematic diagram illustrating a computer system, in accordance with some embodiments of the present disclosure.

While the present disclosure is amenable to various modifications and alternative forms, specifics thereof have been shown by way of example in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

Aspects of the present disclosure relate to power management of one or more processor cores. While the present disclosure is not necessarily limited to such applications, various aspects of the disclosure may be appreciated through a discussion of various examples using this context.

It will be readily understood that the components of the present embodiments, as generally described and illustrated in the Figures herein, may be arranged and designed in a wide variety of different configurations. Thus, the following details description of the embodiments of the apparatus, system, method, and computer program product of the present embodiments, as presented in the Figures, is not intended to limit the scope of the embodiments, as claimed, but is merely representative of selected embodiments.

Reference throughout this specification to "a select embodiment," "at least one embodiment," "one embodiment," "another embodiment," "other embodiments," or "an embodiment" and similar language means that a particular feature, structure, or characteristic described in connection with the embodiment is included in at least one embodiment. Thus, appearances of the phrases "a select embodiment," "at least one embodiment," "in one embodiment," "another embodiment," "other embodiments," or "an embodiment" in various places throughout this specification are not necessarily referring to the same embodiment.

The illustrated embodiments will be best understood by reference to the drawings, wherein like parts are designated by like numerals throughout. The following description is intended only by way of example, and simply illustrates certain selected embodiments of devices, systems, and processes that are consistent with the embodiments as claimed herein.

Many known modern processing devices, sometimes referred to as central processing units, or CPUs, are positioned on a single chip (or die, where the terms are used interchangeably herein) as an integrated circuit. Many of these known CPUs are multicore processors, i.e., a computer processor on a single integrated circuit, or chip, with two or more separate processing units, called cores, each of which reads and executes program instructions. In some embodiments, such multicore processors include in excess of 32 cores. These multiple cores may be powered through a steady-state power source, i.e., in some embodiments, one or more Voltage Regulator Modules (VRMs). As the processing loads on the cores vary, a sudden change in the core activity of a computer processor can result in a relatively large increase in the current drawn from the power source, i.e., the VRMs. Such large current transients drawn from the VRMs may approach or exceed the ratings of the respective VRMs, which may induce a voltage droop in the computer processor due to inductive noise therein. Voltage droop refers to the reduction in available electric current in an electric circuit to process the present loading on one or more of the processing cores that is manifested as a reduction in the supply voltage to the cores. If the multiple cores in a multicore processor change from relatively low activity to relatively high activity in a relatively small interval of time, the voltage droop observed at all processor cores may be significant. In some situations, the voltage droop may be significant enough to exceed an established threshold and thereby induce a microarchitectural stall event. Such a stall event is sometimes referred to as a pipeline stall, where the execution of instructions is delayed and, in some instances, the chip might shift into a non-functional state, i.e., potentially lead to a core shut-down event. Some large stall events have features including, without limitation, one or more operations that have extended latencies. Moreover, in certain circumstances, routine inducement of voltage droop conditions may reduce the functional life span of the integrated circuit.

In addition, many of the known multicore processors' cores are clocked at high frequencies, i.e., in some embodiments, frequencies in excess of 4 Gigahertz (GHz). The combination of the high frequencies and the increased population and density of the cores may induce heat generation such that, under certain circumstances, the total power demand of the multitude of cores may exceed the thermal capability of the heat removal features for the multicore processors to properly cool the microprocessor, where the functional lifespan of the integrated circuit may be reduced.

In at least some of such known multiprocessors, there are a number of techniques to combat voltage droop and core temperature excursions. In some embodiments, features are present to decrease the clock frequency of the affected processor cores. In some embodiments, it is possible to trigger circuits that throttle (e.g., limit the instruction fetch rate from the typically adjacent L1 and L2 cache) the processor core through one or more throttle actions. Throttling the processor core can reduce how quickly the processor core executes instructions, thereby decreasing the rate of heat generation. In addition, throttling the processor core when voltage droop occurs can facilitate the core continuing to execute the respective instructions even with a reduced voltage. In this way, throttling the processor core can prevent the aforementioned conditions that may decrease the life expectancy of the respective integrated circuits. However, routine throttling of the processor cores directly affects the overall efficiency of the respective integrated circuit.

A system and method are disclosed and described herein for energy management of one or more processor cores of a multicore processor. Specifically, the system and method are directed toward executing energy management of the one or more processor cores. More specifically, the system and method are directed toward managing energy consumption of the one or more processor cores through digital power proxy data and the respective energy consumption determinations subject to such power proxy data. As used herein, the terms "energy" and "power" (energy per unit time) are used interchangeably. In some embodiments, the processor cores of the multicore processor are organized into groups of four cores per chiplet, i.e., quad core chiplets, or simply quad chiplets, where four is a non-limiting number. Therefore, for those multicore processors that include 32 processor cores, such processors include 8 quad chiplets.

In embodiments disclosed herein, each microprocessor core includes a digital power proxy that approximates the energy the processor core consumes in real-time. Each digital power proxy uses a weighted computation of core performance counters to produce an approximation of the power used by the core over a predefined interval for respective operations. Temporally-based system management intervals are established, e.g., and without limitation, approximately 500 microseconds (μs), where such intervals are referred to as workload optimized frequency (WOF) intervals. During such WOF intervals, each core is allocated a WOF interval energy target. The WOF interval energy target (sometimes referred to as the WOF interval energy target (WIT) or WOF energy budget) is at least partially based on the power state (PState) (a set of values that includes the present voltage and the present frequency), an accumulated error from the previous WOF interval, and the power characteristics of the processing system. Such real-time power characteristics include, without limitation, the local core management setting up the WOF interval energy target and evaluating if the core hit the power target from the previous interval, and determining the value of the difference (sometimes referred to as the error). There are chip power considerations where other cores may be consuming too much power and could be starting to cause a thermal issue or current droop, thereby causing the new energy target for the respective core under consideration to be reduced.

Each WOF interval includes a temporally smaller PITCH interval that is divided into sub-intervals, i.e., periods, for localized energy management individualized to each individual core. In some embodiments, the number of periods per PITCH interval is 16 and in some embodiments the number of periods per PITCH interval is 64, where the values 16 and 64 are non-limiting. For each PITCH interval, and more specifically, for the first PITCH period of the respective PITCH interval, an initial energy target for the respective initial PITCH period is generated, and the subsequent period energy targets will likely differ as the process temporally advances from period to period within the PITCH interval.

In at least some embodiments, each processor core includes embedded dynamic power throttle logic to reduce core performance through limiting the instruction fetch rate by the core from the nearby cache, and/or limiting the number of in-flight instructions already present within the core. Activating these throttle mechanisms is a proven technique to reduce the instantaneous core power draw.

In many of the embodiments described herein, the finely-tuned core throttle state for each individual processor core is measured in the number of instructions per unit time (IPUT), e.g., instructions per second (IPS). The terms "throttle state" and "throttling state" are used interchangeable herein. In some embodiments, the units of instructions per cycle (IPC) are used. In some embodiments, the individual increments extend to, for example, and without limitation, 255 IPUT. The throttling action, if required, may be increased or decreased in incremental units of 1 IPUT or multiple IPUT. In one or more embodiments, the target energy consumption (period energy target) for each core is established based on empirically-derived values for the present and impending instructions. These empirically-derived values are based on at least the number of instructions for a particular task and the computing resources, including the energy consumption, that is necessary for executing the respective instructions. Specifically, the empirically-derived values are determined through a computer benchmark specification for CPU integer processing power. For example, a set of benchmarks designed to test the CPU performance of a modern server computer system includes, without limitation, SPECint (as maintained by the Standard Performance Evaluation Corporation (SPEC)), where SPECint is the integer performance testing component of the associated SPEC test suite. Using the SPECINT benchmark, the power reduction in the core and respective L2 cache was measured for every SPECint sub-benchmark with a range of settings for exclusively instruction transmission rate throttling and in-flight instruction throttling. One or more statistical analyses were applied to produce a combined 64-entry table, i.e., an index of instruction fetch rate throttle settings and in-flight instruction throttle settings that map a substantially linear power savings to the throttle index, where the linearity is discussed further herein with respect to FIG. 5. The index of instruction fetch rate throttle settings and in-flight instruction throttle settings is referred to as the period fine throttle index, sometimes referred to as the P-FTX. Accordingly, the SPECINT benchmarks facilitated calibrating a power savings for each throttle setting, i.e., core throttle state value, through application of combinations of specific voltages, frequencies, and throttle settings during each benchmark execution.

In some embodiments, the period fine throttle index's "$0^{th}$" index entry results in no power savings, and the index's "$63^{rd}$" index entry results in a 66% power savings. These values were derived empirically as discussed elsewhere herein (see FIG. 5), and varying processing systems may have varying index values. The aforementioned period fine throttle index is stored in a local SRAM device, embedded within, and accessible from, a Quad Management Engine (QME) which includes features to dynamically update the period fine throttle index, where the term "quad" applies to the four-core chiplets as previously described. However, such management engines are not limited to quad core chiplets. The QME also includes a Decode Throttle Core (DTC) sequencer that is configured to receive and translate index requests directed toward one of the 64 index values, read the appropriate index value out of the index in the QME SRAM, and then apply the respective core throttle state value to the fine throttle control that will throttle the core appropriately.

In one or more embodiments, as further described herein with respect to FIGS. 8-13, the values of each individual core throttle state of the multicore processors are determined and adjusted through a proportional-integral (PI) hardware control loop (sometimes referred to as a Proxy-based Instruction Throttling Control Hardware (PITCH) loop or PITCH logic). The subject PITCH loop automatically learns and adjusts to changing workloads on each processor core. A PITCH period energy target (i.e., that energy target determined for each of the 16 or 64 periods in the respective WOF interval, and referred to herein as the period energy target) is at least partially based on the energy target generated for the respective WOF interval. The period energy target can vary per period, with, e.g., uniformly or polynomially distributed energy budgets, and minimum and maximum clipping values established for facilitating the fine tuning of the throttle state adjustments. For example, the uniform energy budget distribution results in every period in the WOF interval being capped at a value of the WOF interval energy target (WIT) divided by the number of periods in the WOF interval. The polynomial energy budget distribution allows for a "bursty" workload, i.e., a core workload including bursts of instructions as compared to a uniform transmission of instructions to the respective cores. The polynomial energy budget distribution results in the first four periods in the WOF interval being capped at a value of twice the WOF interval energy target divided by the number of periods in the WOF interval. Since the PITCH control loop recognizes such instruction bursts, such bursts of instructions will not be clipped through the throttling mechanisms early in the respective WOF interval. The delay in clipping the bursts facilitates the respective cores harnessing significant lost performance opportunity in contrast to the uniform budgeting features. The local (core-specific) PITCH loop facilitates the fine-grain core power management as described further herein.

In addition, in one or more embodiments, the PITCH loop is configured to target reduced core energy consumption at a fixed frequency based on the period energy targets by dynamically adjusting the core throttle state. The throttle settings, i.e., the core throttle state values are generated and transmitted to the processor core by writing the requested period fine throttle index value to a period fine throttle index (P-FTX) register. In some embodiments, for a faster and more consistent response, the PITCH control loop monitors the core and requests a new throttle index value as warranted. A DTC sequencer reads the new throttle index value from the period fine throttle index in the QME SRAM and applies the respective core throttle state settings to the core as a response to a fine throttle index request from the PITCH logic. Accordingly, abstracting the core throttle state settings to an index (i.e., the period fine throttle index), and automatically applying the core throttle state settings in response to a sensed change in the respective core's workload, simplifies and facilitates complex hardware and software control loops (if implemented) to manage the core power consumption.

Moreover, in at least some embodiments, for each period, the core's period energy value (based on the sum of all activity in the respective period) is compared to the period energy target. If the energy consumed by the core, i.e., the period energy value was less than (under) the period energy target, i.e., thereby generating an under value, the requested period fine throttle index (P-FTX) value in the P-FTX register is reduced on a proportional basis, based on a scaling algorithm of the delta between the target and actual value, thereby causing less throttling to the core in the next period. If the period energy value is greater than (over) the period energy target, i.e., thereby generating an over value, the requested P-FTX in the P-FTX register is increased on a proportional basis to increase the throttling of the core in the next period. The over/under consumption of the energy consumed in a period is accumulated and factored into computation of the next throttle state index value in the P-FTX register for the next period target. Since the consumption delta values are accumulated based on the power target for each period, this power target may be well over what the workload can achieve for earlier periods within the WOF interval when using the polynomial distributed budget. Also, based on the accumulated error values from all previous periods, the "ideal" period power target (IPT) is adjusted to calculate the power target for the next period. In some embodiments, the value of the core throttle state index value in the P-FTX register is updated based on the normalized delta from the previous pitch periods (for the proportional control in the PITCH loop) and based on the normalized error adjustment from the calculated IPT (for the integral control in the PITCH loop). In addition, in at least some embodiments, the PITCH loop also contains per period minimum and maximum FTX register clippings to temper the PITCH loop reaction though bounding the possible values.

In addition, as preciously described, the PITCH loop is a hardware control loop, i.e., the PITCH loop is configured as physical circuitry that uses software to execute the features as described herein. In contrast, implementation as a software control loop would require the control loop be managed through software control features resident within the QME, or, alternatively, one or more additional QMEs. In such software control loop implementations, at least one of the QMEs is configured to exercise such control of the PITCH logic and since the PITCH logic operates in real-time, it requires dedicated resources from the associated QME. Therefore, in at least some of the embodiments described herein, the PITCH loop is implemented as a hardware control loop to decrease the reliance on the limited QME resources. In addition, the software control loop implementation would often rely on a program sequence (instructions) running on a dedicated processor to sample inputs, combine terms, and adjust the outputs. The dedicated hardware control loop described herein executes operations, e.g., and without limitation, sampling and combining terms in parallel with the other processor-based operations, and reacting more quickly in a cycle-by-cycle timeframe, thereby enhancing the speed of operation over that of a software control loop. Moreover, for example, in such hardware-based embodiments, each period is based on a programmable cycle counter, and the DTC sequencer facilitates adjustment of the core throttle state index values in the respective P-FTX register without software intervention.

As described herein, the sub-WOF interval period power management technique facilitates the PITCH loop performing fine-grained throttling of the respective core's power consumption to a system interval power budget, which can be altered for each interval. Accordingly, it is utilized for runtime core power management.

In one or more embodiments, this fine-grained core throttle management is supplemented by protective hardware features, including, without limitation, a digital droop sensor to measure core voltage droop and the associated hardware to quickly react with coarse core throttling to prevent any decrease in the service life of the integrated circuit. The coarse throttling is implemented in hardware to minimize the reaction time and arrest the voltage droop. When engaged, the coarse throttling has a significant impact on core performance. Accordingly, the fine-grained power management through the PITCH loop is configured to prevent exercising of the coarse throttle control.

Referring to FIG. 1, a block schematic diagram is provided illustrating a computer system (herein referred to as "the system 100"), in accordance with some embodiments of the present disclosure. The system 100 includes one or more processing devices 104 (only one shown) communicatively and operably coupled to one or more memory devices 106 (only one shown) through a communications bus 102, and in some embodiments, through a memory bus (not shown). The processing device 104 is a multicore processing device (discussed further herein with respect to FIGS. 1, 2, and 3). The system 100 also includes a data storage system 108 that is communicatively coupled to the processing device 104 and memory device 106 through the communications bus 102. The system 100 further includes one or more input devices 110 and one or more output devices 112 communicatively coupled to the communications bus 102. In addition, the system 100 includes one or more Internet connections 114 (only one shown) and one or more network connections 118 (only one shown). The Internet connections 114 and the network connections 118 facilitate communicatively coupling the processing device 104 and the memory device 106 to the cloud 116 and one or more other computing devices 120, respectively, through the communications bus 102. In some embodiments, the Internet connections 114 facilitate communication between the system 100 and one or more cloud-based centralized systems and/or services (not shown in FIG. 1).

The processing device 104 includes a first microprocessor 130-1, a second microprocessor 130-2, etc., up through an $N^{th}$ microprocessor 130-N, where N is any integer that enables operation of the system 100 as described herein. Each of the microprocessors 130-1 through 130-N are multicore processors as described further with respect to FIG. 2. In many embodiments, the majority of the energy management features described further herein are present in the individual microprocessors 130-1 through 130-N.

In at least some embodiments, the data storage system 108 provides storage to, and without limitation, a knowledge base 190 that includes data that may be employed by the microprocessors 130-1 through 130-N, e.g., and without limitation, the SPECint benchmarks 192.

Figure 2:
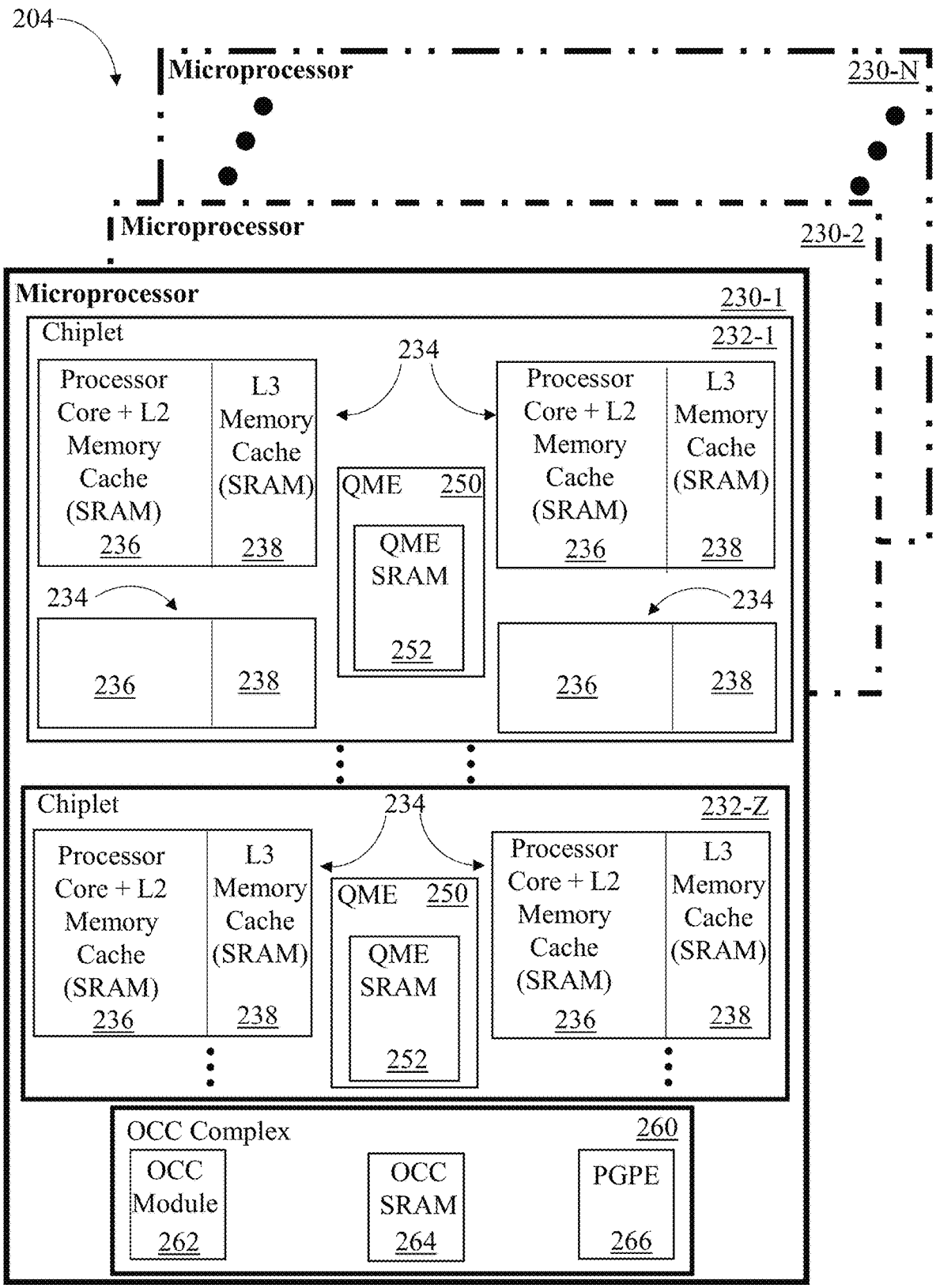
FIG. 2 is a block schematic diagram illustrating the microprocessors shown in FIG. 1 with additional detail, in accordance with some embodiments of the present disclosure.

Referring to FIG. 2, a block schematic diagram is presented illustrating the microprocessors 230-1, 230-2, etc. through 230-N, of a processing device 204, in accordance with some embodiments of the present disclosure. The processing device 204 is substantially similar to the processing device 104 (shown in FIG. 1). Accordingly, the microprocessors 230-1 through 230-N are substantially similar to the microprocessors 130-1 through 130-N, respectively (shown in FIG. 1). In some embodiments, the microprocessors 230-1 through 230-N are substantially similar to each other. In some embodiments, one or more of the microprocessors 230-1 through 230-N are dissimilar to one or more of the other microprocessors 230-1 through 230-N. The outlines of the microprocessors 230-1 through 230-N as drawn are substantially similar to the respective microprocessors 130-1 through 130-N as drawn in FIG. 1 to facilitate the discussions herein.

The quad chiplet 232-1 includes four processor devices 234, where each processor device 234 includes a processor core plus an L2 memory cache portion 236 (herein referred to as "the core/L2 portion 236") and an L3 memory cache portion 238 (herein referred to as "the L3 portion") that is communicatively and operably coupled to the core/L2 portion 236. Each core/L2 portion 236 includes approximately 2 megabytes (MB) of L2 SRAM and each L3 portion 238 includes approximately 4 MB of L3 SRAM, where the 2 MB and 4 MB values are non-limiting. The quad chiplet 232-1 also includes a Quad Management Engine (QME) 250 that is an autonomous subsystem that is communicatively and operably coupled to all four processor devices 234. In some embodiments, the QME 250 is a dedicated microcontroller. The QME 250 is configured to facilitate management of the processor devices 234, including, without limitation, powering the processor devices 234 between "off" (or "stop") and "on" states and the core power draw.

In at least some embodiments, the QME 250 includes 64 kilobytes (KB) of QME SRAM 252, where the value 64 is non-limiting. Among other features described further herein, the QME SRAM 252 houses a throttle index table, i.e., the period fine throttle index (P-FTX), also described further herein. In addition, the QME SRAM 252 includes features configured to activate core throttling circuits (discussed further herein). Moreover, the QME 250 includes features configured to dynamically update the period fine throttle index as discussed further herein. The remaining quad chiplets up to and including the quad chiplet 232-Z are substantially similar to the quad chiplet 232-1.

In at least some embodiments, the microprocessor 230-1 includes an on-chip controller (OCC) complex 260 that facilitates management of one or more functions of the microprocessor 230-1. The OCC complex 260 includes an OCC module 262 that is a combination of hardware and firmware that is configured to, without limitation, support the system power management, maintain the temperature of the microprocessor 230-1 within established rating parameters, and execute fault tolerance and performance boost features. The OCC complex 260 also includes approximately 1 MB of OCC SRAM 264 communicatively and operably coupled to the OCC module 262 to support operation of the OCC module 262. In addition, the OCC complex 260 includes a PState general purpose engine (PGPE) 266 that is configured to globally manage the power consumption of the microprocessor 230-1 across all of the quad chiplets 232-1 through 232-Z based on the power state (PState) of the microprocessor 230-1. The PState includes a set of values such as the present voltage and the present frequency. The PGPE 266 is discussed further herein with respect to its role in power consumption management for the individual processor cores in the respective the core/L2 portions 236.

Figure 3:
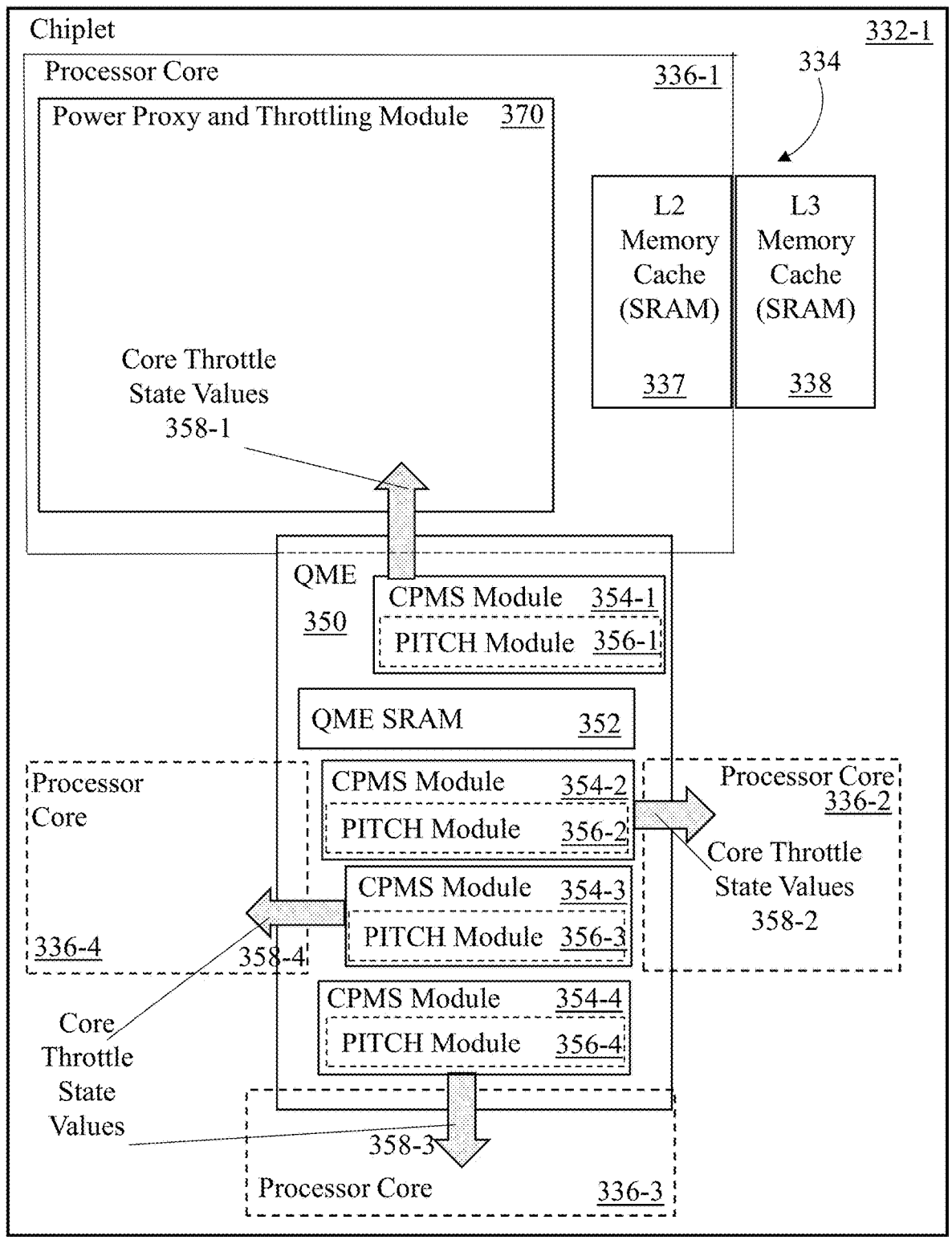
FIG. 3 is a block schematic diagram illustrating a quad chiplet, in accordance with some embodiments of the present disclosure.

Referring to FIG. 3, a block schematic diagram is presented illustrating a quad chiplet 332-1, in accordance with some embodiments of the present disclosure. The quad chiplet 332-1 is substantially similar to the quad chiplet 232-1(shown in FIG. 2) and includes a first processor core 334 that includes a first processor 336-1, L2 memory cache 337, and L3 memory cache 338. The quad chiplet 332-1 also includes a second processor core 336-2, a third processor core 336-1, and a fourth processor core 336-4. A QME 350 (that is substantially similar to the QME 250 shown in FIG. 2) includes a QME SRAM 352 (that is substantially similar to the QME SRAM 252 shown in FIG. 2). The QME 350 also includes a first core power management satellite (CPMS) module 354-1. In some embodiments, the CPMS module 354-1 is referred to as a "QME satellite," and in some embodiments, as a "power management satellite." In the embodiments described further herein, the CPMS module 354-1 interfaces with a power proxy and throttling module 370 (discussed further in reference to FIG. 4). The CPMS module 354-1 includes a Proxy-Based Instruction Throttling Control Hardware (PITCH) module 356-1 that includes an adaptive proportional-integral (PI) control loop. The PI control loop is configured to analyze the activity level of the processor core 336-1 and dynamically determine fine control throttle state setpoints, i.e., core throttle state values 358-1, or adjustments, thereto as discussed further herein (e.g., with respect to FIG. 13).

The QME 350 also includes a second CPMS module 354-2 that includes a second PITCH module 356-2 configured to dynamically determine core throttle state values 358-2. The QME 350 further includes a third CPMS module 354-3 that includes a third PITCH module 356-3 configured to dynamically determine core throttle state values 358-3. In addition, the QME 350 includes a fourth CPMS module 354-4 that includes a fourth PITCH module 356-3 configured to dynamically determine core throttle state values 358-4. In some embodiments, the four CPMS modules 354-1 through 354-4 and their respective PITCH modules 356-1 through 356-4 are substantially identical. In some embodiments, the four CPMS modules 354-1 through 354-4 and their respective PITCH modules 356-1 through 356-4 are individualized for distinguishing features associated with their respective processor cores 336-1 through 336-4.

Figure 4:
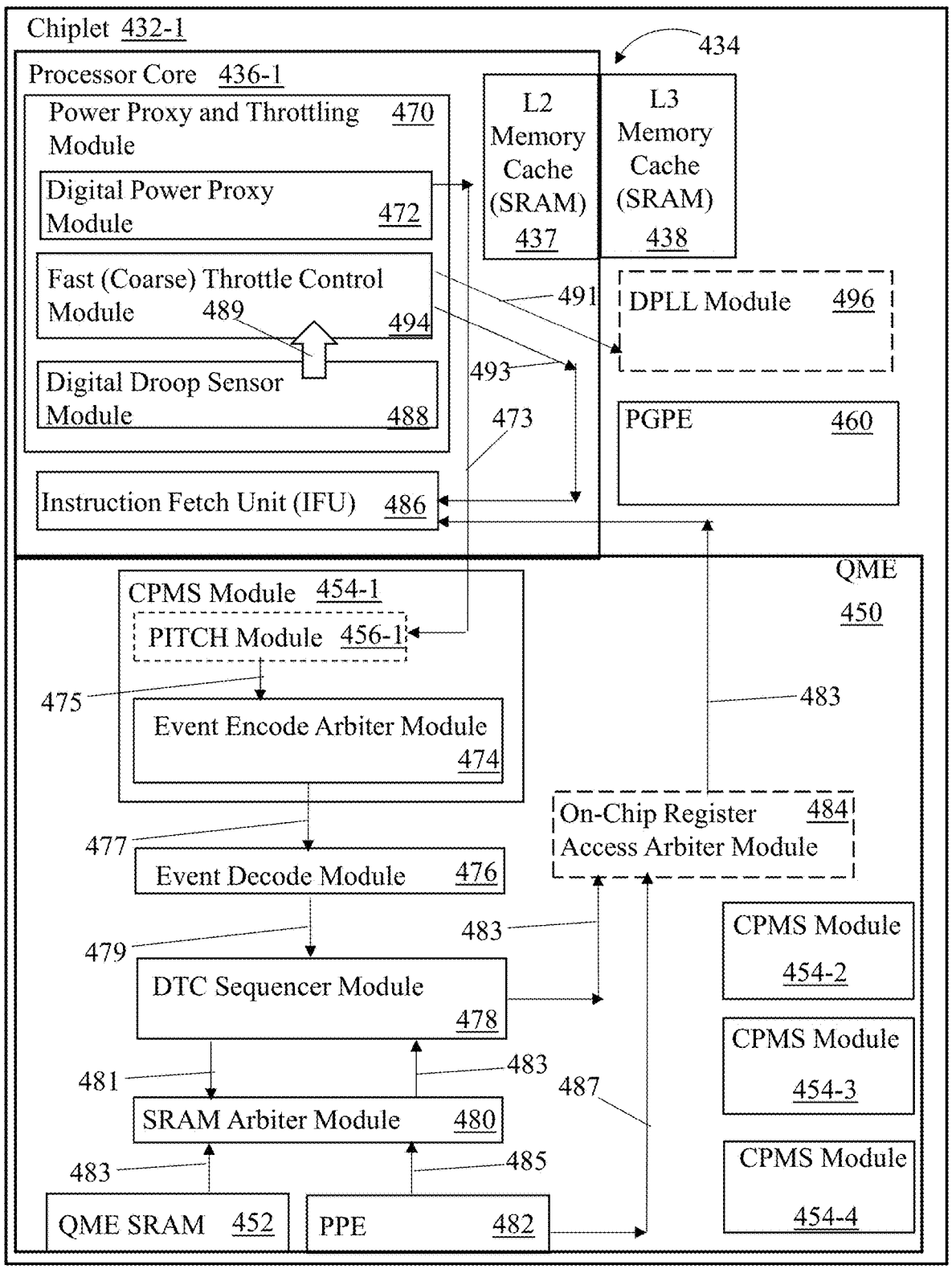
FIG. 4 is a block schematic diagram further illustrating the quad chiplet shown in FIG. 3, in accordance with some embodiments of the present disclosure.

Referring to FIG. 4, a block schematic diagram is presented further illustrating the quad chiplet 332-1 shown in FIG. 3, in accordance with some embodiments of the present disclosure. The chiplet 432-1, processor core 436-1, L2 memory cache 437, L3, memory cache 438, QME 450, QME SRAM 452, CPMS modules 454-1 through 454-4, PITCH module 456-1, and power proxy and throttling module 470 are substantially similar to the similarly numbered items in FIG. 3. The PGPE 466 is substantially similar to the PGPE 266 (shown in FIG. 2). In some embodiments, the PGPE 266 executes existing static code resident within the PITCH module 456-1, where the PGPE 266 functions within the constraints of the aforementioned code. The power proxy and throttling module 470 includes one or more digital power proxy modules 472 (only one shown) that are configured to approximate the power the processor core 436-1 consumes in real-time. The digital power proxy module 472 is communicatively and operably coupled to the PITCH module 456-1 within the CPMS module 454-1. In general, the digital power proxy module 472 uses a weighted computation of certain core performance counters to produce an approximation of the power used by the processor core 436-1 over a predefined interval.

The digital power proxy module 472 monitors a set of counters (not shown) that are associated with energy/power management, e.g., and without limitation, Energy Management Power And THermal (EMPATH) counters that are specifically, and exclusively, configured to count previously specified events that are associated with power management of the respective processor core 436. Whenever an activity, i.e., event specified to be monitored occurs, the digital power proxy module 472 adds a value equal to a power usage weight or scaling associated with the event to the counter. The weighting and scaling factors used to determine the power usage values of the events are determined through one or more of empirical data and processor core models. Each of the power consumption events for the processor core 436-1 include a value representative of the power consumption for each respective event, and the occurrence of each event over a predetermined period of time is counted to facilitate the generation of an accumulated value for the total estimated power consumption by the processor core 436-1 over the respective interval or period. In some embodiments, an event value is referred to as a power proxy increment, where the power proxy increment is a numerical value that represents the power consumption for the respective events. In some embodiments, the power proxy increment is referred to as an activity proxy value. The power proxy increment values associated with the events occurring during a predetermined interval or period of time are accumulated (i.e., summed) in an actual period proxy (APP) accumulator (not shown in FIG. 4) for use in the PITCH module 456-1, as described further herein with respect to FIGS. 8-13. Accordingly, for each predetermined interval or period of time, an estimated value, i.e., an accumulated APP power value 473 representative of the power consumption by the processor core 436-1 during a predetermined interval or period of time is generated for further use as described further herein with respect to FIGS. 8-13.

In at least some embodiments, the chiplet 432-1 includes embedded dynamic power throttle logic to manage core performance through limiting the instruction fetch rate by the processor core 436-1 from the nearby L2 memory cache 437, and/or limiting the number of in-flight instructions already present within the processor core 436-1. As previously described, the digital power proxy module 472 is communicatively and operably coupled to the PITCH module 456-1 within the CPMS module 454-1, where the digital power proxy module 472 is configured to generate and transmit the accumulated APP power value 473 of the power consumption by the processor core 436-1 during a predetermined interval or period of time.

The CPMS module 454-1 also includes an event encode arbiter module 474 that is communicatively and operably coupled to the PITCH module 456-1. The PITCH module 456-1 is configured to generate and transmit a FTX request event signal 475, where "FTX" represents "fine throttle index" and the signal 475 is representative of an event in the processor core 436-1 that will require more or less throttling than is presently in place. The event encode arbiter module 474 is configured to receive the FTX request event signal 475 and selects those events that will be further processed and encodes those events for transmission as encoded FTX event signals 477 to an event decode module 476 that is configured to receive and decode the FTX event signals 477 to generate decoded FTX event signals 479 and transmit them to a decode throttle core (DTC) sequencer module 478. The DTC sequencer module 478 is configured to receive FTX event signals 479 from all four CPMS modules 454-1 through 454-4, and, therefore, the DTC sequencer module 478 is configured to sequence the order upon which the FTX event signals 479 will be acted upon. In addition, the DTC sequencer module 478 is configured to generate a QME SRAM access request signal 479 that is transmitted to a SRAM arbiter module 480. The SRAM arbiter module 480 is configured to receive the QME SRAM access request signal 479 and grant access to the QME SRAM 452 to read the proper core throttle state index values (both fetch and in-flight) from the period fine throttle index including the core throttle state index values resident within the QME SRAM 452. The proper core throttle setting value is transmitted to the DTC update sequencer module 478 as an instruction fetch rate throttle setting signal 483.

In at least some embodiments, there are a number of embedded microcontrollers referred to as power processing elements (PPEs) within the QME 450. As shown in FIG. 4, a PPE 482 is communicatively and operably coupled to the SRAM arbiter module 480 to issue control commands 485 to the SRAM arbiter module 480. The QME 450 further includes an on-line register access arbiter module 484 communicatively and operably coupled to the DTC sequencer module 478. In at least some embodiments, the on-line register access arbiter module 484 is a global application for the entire microprocessor 230-1, and is therefore shown in phantom. The chiplet 432-1 includes a plurality of registers thereon and therefore includes the necessary software for reading from and writing to the registers though an on-chip networking application, including, and without limitation, a serial communication infrastructure implemented to facilitate reading to and writing from the plurality of registers within the microprocessor 230-1. The on-line register access arbiter module 484 arbiter module 484 is communicatively and operably coupled to the PPE 482 to receive control commands 487 from the PPE 482. The SRAM arbiter module 480 is further configured to transmit the instruction fetch rate throttle setting signal 483 to the DTC update sequencer module 478, that, in turn, is configured to transmit the instruction fetch rate throttle setting signal 483 to the on-line register access arbiter module 484.

In some embodiments, the processor core 436-1 includes an instruction fetch unit (IFU) 486 that is configured to modulate the throttling of the fetch rate of the instructions into the processor core 436-1 and throttling of the in-flight instructions, in that order of priority. Specifically, the fetch rate throttling is used to produce the initial throttle entries to prevent the core pipeline from filling up. As the rate throttling approaches its maximum effectiveness, in-flight throttling is incorporated to produce a further reduction in power.

In some embodiments, the IFU 486 is a portion of a larger throttle activation system that is beyond the scope of this disclosure. The on-line register access arbiter module 484 is configured to transmit the instruction fetch rate and in-flight instructions throttle settings signal 483 to the IFU 486 in the processor core 436-1. The IFU 486 facilitates managing the instruction fetch rate and the in-flight instructions that optimally balance power consumption up to predetermined limits to most effectively use the processing capabilities of the processor core 436-1 while avoiding downward voltage transients that may induce voltage droop conditions and subsequently, more robust throttle actions. The IFU 486 is further configured to apply the fine throttle rate and in-flight settings to the decode stage of the processing core's instruction cycle, restricting the rate of decoding and dispatch of the instructions, and thereby reducing the demand for instructions from the IFU 486, where the fetch action by the IFU 486 will not exceed the present restrictions on decoding and dispatching the instructions.

In one or more embodiments, the processor core 436-1 includes a digital droop sensor module 488 that is configured to determine impending voltage droop conditions on the processor core 436-1 and generate and transmit a voltage droop signal 489. The processor core 436-1 further includes a fast (coarse) throttle control module 494 that is communicatively and operably coupled to the digital droop sensor module 488. The microprocessor 230-1 (shown in FIG. 2) also includes a digital phase-locked loop (DPLL) module 496 that is shown in phantom in FIG. 4 to represent that the chiplet 432-1 itself does not include the DPLL module 496; however, the DPLL 496 is configured to implement the actions as described herein with respect to a portion of the components in FIG. 4. Specifically, the DPLL module 496 is configured for chip-level frequency control for all of the processor cores on the respective microchip 230-1, including each of the four processor cores 436-1 through 436-4 (only processor core 436-1 shown on FIG. 4). The coarse throttle control module 494 is communicatively and operably coupled to the DPLL module 496 and the IFU 486. Accordingly, the coarse throttle control module 494 is further configured to transmit frequency control commands 491 and instruction fetch control commands 493 to the DPLL module 496 and the IFU 486, respectively, to decrease the instruction processing load on the processor core 436-1 rapidly through the two throttling mechanisms. In some embodiments, the instruction fetch rate is typically the first variable that is modulated, since it does not involve modulating the core clocking. In contrast, the DPLL module 496 reacts to the digital droop sensor module 488 and is configured to quickly reduce the core frequency, and is therefore, in at least some embodiments, a secondary control mechanism that is employed to reduce the severity of the impending voltage droop conditions.

Figure 5:
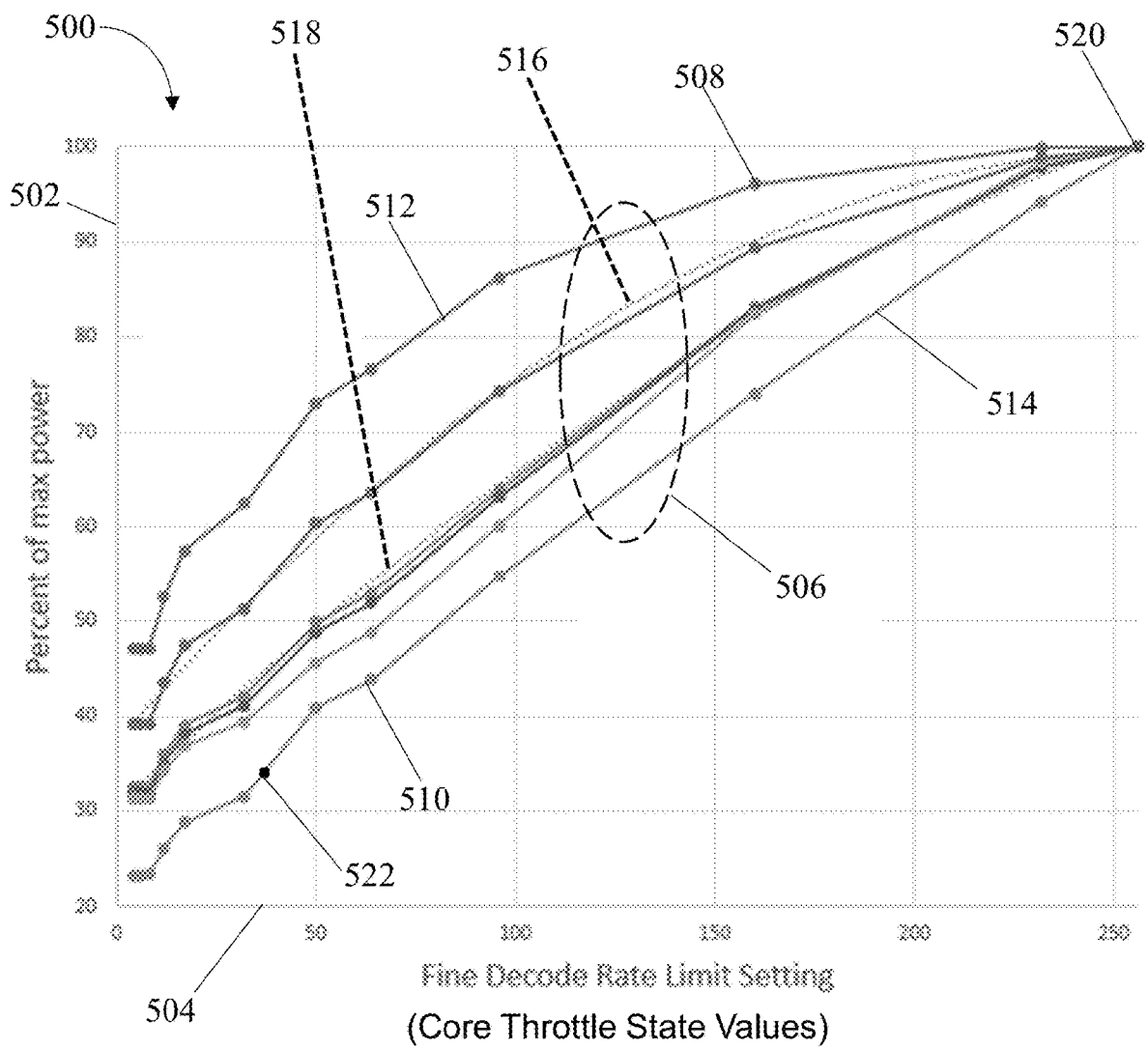
FIG. 5 is a graphical diagram illustrating a percent of maximum power as a function of a fine decode rate limit setting, in accordance with some embodiments of the present disclosure.

Referring to FIG. 5, a graphical diagram 500 is presented illustrating a percent of maximum power as a function of a fine decode rate limit setting, in accordance with some embodiments of the present disclosure. As described with respect to FIG. 4, the rate limit settings are directed toward the decode and dispatch portion of the instruction cycle. The graphical diagram 500 includes a y-axis 502 that is representative of the percent maximum power of a processor core extending from 20% through 100%. The graphical diagram 500 also includes an x-axis 504 that is representative of the fine decode rate limit setting (core throttle state value) for 256 increments, i.e., extending from 0 instructions per unit time (IPUT) to 255 IPUT.

The graphical diagram 500 further includes a plurality of curves 506 representing the relationships between the power consumption of the processor core and the core throttle state values of the instruction fetch rate for a variety of core conditions and analyses. The power consumption for the spectrum of operations executed by the core is well measured and the performance of the core through processing the instructions is well known. Therefore, initially, for a known workload, a baseline data set was recorded with no throttling applied for a number of SPECint benchmarks, i.e., the fine decode rate limit setting was set to 255 IPUT. Subsequent runs of the various SPECint benchmarks with varying degrees of rate and in-flight throttling and the respective power consumption values for the core were recorded. The power reduction in the core was measured for the respective SPECint benchmarks, thereby developing a volume of empirical data. Two examples of the recorded data for the respective SPECint benchmarks are identified as 508 and 510 in FIG. 5, where the values associated with the benchmark 508 is approximately 95% of maximum core power for a fine decode rate limit setting of approximately 160 IPUT, i.e., a throttling of approximately 106 IPUT. Similarly, for the benchmark 510, the values are approximately 44% of maximum core power for a fine decode rate limit setting of approximately 65 IPUT time, i.e., a throttling of approximately 191 IPUT. Accordingly, as the throttling of the fetch rate of the instructions and the in-flight instructions increases, the respective value of the fine decode rate limit setting decreases with a respective decrease in power consumption by the processor core.

A variety of mathematical techniques were used to derive the respective curves 506 from the benchmark data points. For example, as shown in FIG. 5, a first curve 512 and a second curve 514 define the upper and lower bounds, respectively, of the power reductions to be expected with the respective core throttling. Notably, the subsequent post-testing analyses facilitated deriving the second curve 514. For example, a first fit curve 516 and a second fit curve 518 are derived through the use of a commercially-available curve fit function. The algorithm for the first fit curve 516 is: $Y=-0.0005*X^2+0.4005*X+30.614$; and the algorithm for the second fit curve is: $Y=-0.0009*X^2+0.4725*X+37.393$. These algorithms may be combined with each other, and with other algorithms derived similarly, to generate the second curve 514. A significant portion of the curve 514 between approximately 50 instructions per unit time and 255 instructions per unit time is substantially linear, thereby establishing a substantially linear relationship between core power and core throttling to facilitate predictable responses by the processor core to throttling actions. The near-linearity of the second curve 514 is at least partially due to establish of the parameters necessary for such linearity. In addition to the curve 514, the aforementioned statistical analyses facilitated production of the combined 64-entry period fine throttle index (P-FTX) that is resident within the QME SRAM 452, i.e., the index of instruction fetch rate throttle settings and in-flight instruction throttle settings that map a respective power reduction to the throttle index.

As the core throttle state value 504 is decreased, i.e., as the value decreases from 255 IPUT toward 0 IPUT, the amount of core throttling is increased to decrease the resultant power consumption as shown on the Y-axis 502. Similarly, as the core throttle state value 504 increases from 0 IPUT toward 255 IPUT, the amount of core throttling is decreased and the resultant power consumption is increased. The relationship between the second curve 514 and the throttle index values in the 64-entry period fine throttle index (P-FTX) is substantially linear. As previously described, the period fine throttle index's "$0^{th}$" index entry results in no power savings, and this is equivalent to the 255 IPUT value on the X-axis 504, i.e., point 520 on the second curve 514. Similarly, the index's "$63^{rd}$" index entry results in a 66% power savings, which is equivalent to the point 522 on the second curve 514. These values were derived empirically as discussed, and varying processing systems may have varying index values and core throttle state values. Therefore, a request for increased throttling is substantially equivalent to a request to decrease the respective core throttle state value, and the requested value from the period fine throttle index is increased from the present index value between the $0^{th}$ to $63^{rd}$ index value to a greater index value.

Figure 6:
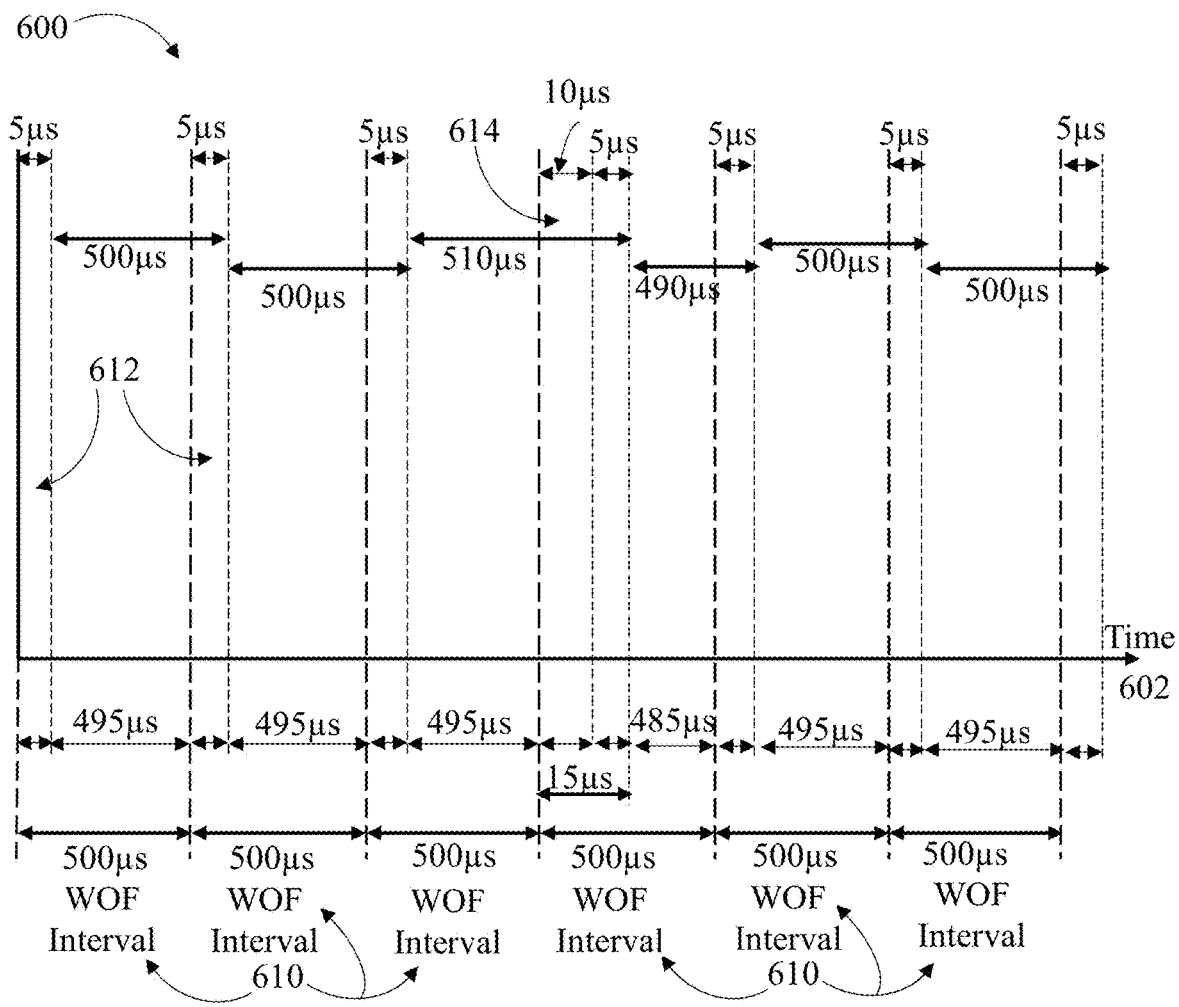
FIG. 6 is a graphical diagram illustrating a sequence of workload optimized frequency (WOF) intervals, in accordance with some embodiments of the present disclosure.

Referring to FIG. 6, a graphical diagram is presented illustrating a sequence 600 of workload optimized frequency (WOF) intervals 610, in accordance with some embodiments of the present disclosure. FIG. 6 includes a horizontal time line 602 for temporal perspective. The WOF intervals 610 are temporally-based system management intervals. In at least some embodiments, the WOF intervals are created through the PGPE (PState general purpose engine) 266, as shown as resident within the OCC complex 260 in FIG. 2. As previously described, the PState is a set of values that includes the present voltage and the present frequency.

In some embodiments, each WOF interval 610 is approximately 500 microseconds (µs) in duration, where the value 500 µs is non-limiting. Each WOF interval 610 includes an interval closing PGPE calculation sub-interval 612 (only two labeled for clarity in FIG. 6) that is approximately 5 µs in duration. The bulk of the operations performed within the remaining 495 µs are discussed further with respect to FIG. 7. During the PGPE calculation sub-interval 612, the OCC module 262 (also embedded within the OCC complex 260 as shown in FIG. 2) updates the QME 250 with information that includes, without limitation, the previous WOF interval 610 is expired. Such information is used to prompt the PGPE 266 to calculate new WOF interval values including, without limitation, a WOF interval energy target for the respective processor core.

In at least some embodiments, the WOF interval energy target represents the energy allocation directed to the respective processor core and is at least partially based on the power state (PState), an accumulated error from the previous WOF interval (described further with respect to FIG. 10), and the real-time power characteristics of the processing system (as previously discussed herein). The OCC module 262 and the PGPE 266 cooperate to update the WOF interval energy target at the beginning of the present WOF interval 610, where the updated WOF interval energy target is transmitted to the respective CPMS 454-1 through 454-4 (see FIG. 4) in the QME 250/450 for use in the present WOF interval 610. The QME 250/450 receives a fine decode throttle value (core throttle state value) equivalent to the index value from the period fine throttle index maintained in the QME SRAM 252/452 based on the new WOF interval energy target. In some embodiments, the core throttle state index value is pulled from the period fine throttle index. In some embodiments, the core throttle state value is determined through real-time calculation through the proportional-integral (PI) hardware control loop through the respective PITCH module, e.g., 456-1 (see FIG. 4) as described further with respect to FIG. 7. Accordingly, the determinations produced during the 5 µs PGPE calculation sub-interval 612 are used during at least a portion of the remaining 495 µs of the present WOF interval 610.

In one or more embodiments, evaluations of the real-time temperatures, voltages, and frequencies of the respective processor cores are monitored in addition to the real-time power consumption with respect to the present power budget. Accordingly, the respective PITCH module (e.g., 456-1) facilitates maximizing the energy consumed by the respective core processor as an indication of maximizing the processing action therein, without attaining, or exceeding, any temperature ratings.

Figure 7:
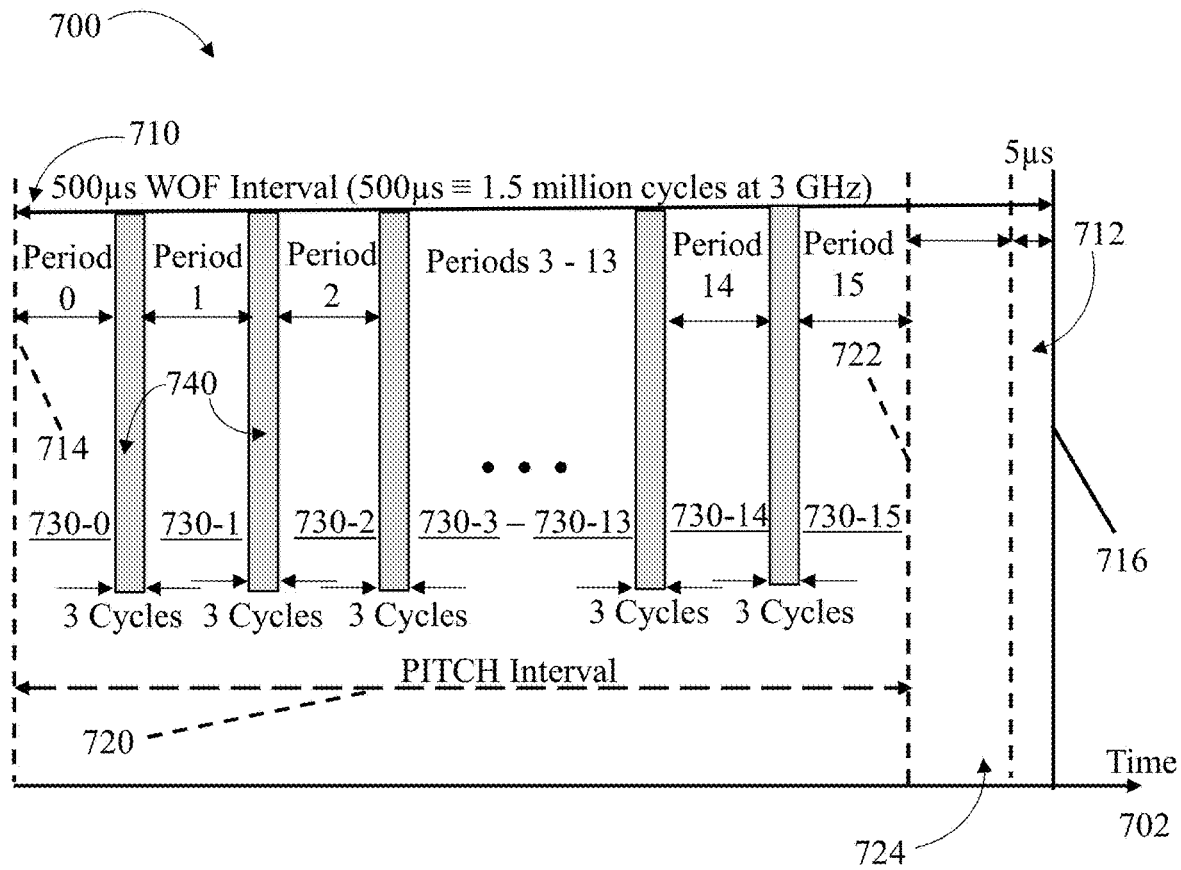
FIG. 7 is a graphical diagram illustrating a PITCH interval, and the accompanying PITCH periods, in relation to a WOF interval, in accordance with some embodiments of the present disclosure.

In at least some embodiments, an occasional 10 µs of other work 614 is added to the beginning of a WOF interval 610, thereby decreasing the portion of the WOF interval 610 described further in FIG. 7 to 485 µs, where the WOF interval 610 is held constant at 500 µs. Such other work includes, without limitation, routine housekeeping within the respective processor core and/or microprocessor. As shown in the second row of double arrows and values from the top in FIG. 6, the temporal distance between the end of a previous 5 µs PGPE calculation sub-interval 612 and the end of the next 5 µs PGPE calculation sub-interval 612 is typically 500 µs. However, the addition of the 10 µs of other work 614 decreases such a temporal distance to 490 µs.

Referring to FIG. 7, a graphical diagram 700 is presented illustrating a PITCH interval 720, and the accompanying PITCH periods 730-0 through 730-15, in relation to one of the WOF intervals 710 (shown as 610 in FIG. 6), in accordance with some embodiments of the present disclosure. In at least some embodiments, the PITCH interval 720, and the accompanying PITCH periods 730-0 through 730-15 are created through the PGPE (PState general purpose engine) 266, as shown as resident within the OCC complex 260 in FIG. 2. As previously described, the PState is a set of values that includes the present voltage and the present frequency.

The PITCH interval 720 and the associated PITCH periods 730-0 through 730-15, and their relationship to the WOF intervals 710 and the fine core throttle control at least partially described with respect to FIG. 4 are described further herein. FIG. 7 includes a horizontal time line 702 for temporal perspective. The graphical diagram 700 includes the WOF interval 710 extending between a first vertical dashed line 714 and a vertical solid line 716, where the first vertical dashed line 714 indicates the beginning of the WOF interval 710 and the vertical solid line 716 indicates the end of the WOF interval 710. The WOF interval is approximately 500 µs which is equivalent to 1.5 million core cycles at a clocking frequency of approximately 3 GHz, and includes the 5 µs PGPE calculation sub-interval 712 (that is substantially similar to the 5 µs PGPE calculation sub-interval 612 shown in FIG. 6).

The first vertical dashed line 714 also indicates the beginning of the PITCH interval 720, where a second vertical dashed line 722 indicates the end of the PITCH interval. The PITCH interval 720 is temporally shorter in duration than the WOF interval 710 to accommodate the 5 µs PGPE calculation sub-interval 612. The shorter duration also accommodates a post-PITCH interval accumulation sub-interval 724 of any duration that enables operation of the fine control of the processor core throttling features as described herein. Each PITCH interval 720 is divided into PITCH periods 730 to facilitate fine processor core throttle control and localized energy management individualized to each individual processor core. In some embodiments, the number of periods 730 per PITCH interval 720 is 16 (as shown in FIG. 7) and in some embodiments the number of periods 730 per PITCH interval 720 is 64, where the values 16 and 64 are non-limiting. The PITCH periods 730 numbered 0 through 15 are labeled 730-0 through 730-15, and are referred to generally and collectively as periods 730. In between each pair of periods 730-0 through 730-15 is a 3-cycle calculation period 740 (only two labeled for clarity, and discussed further below), where the 3-cycle calculation period 740 is not a portion of the respective periods 730.

Figure 8:
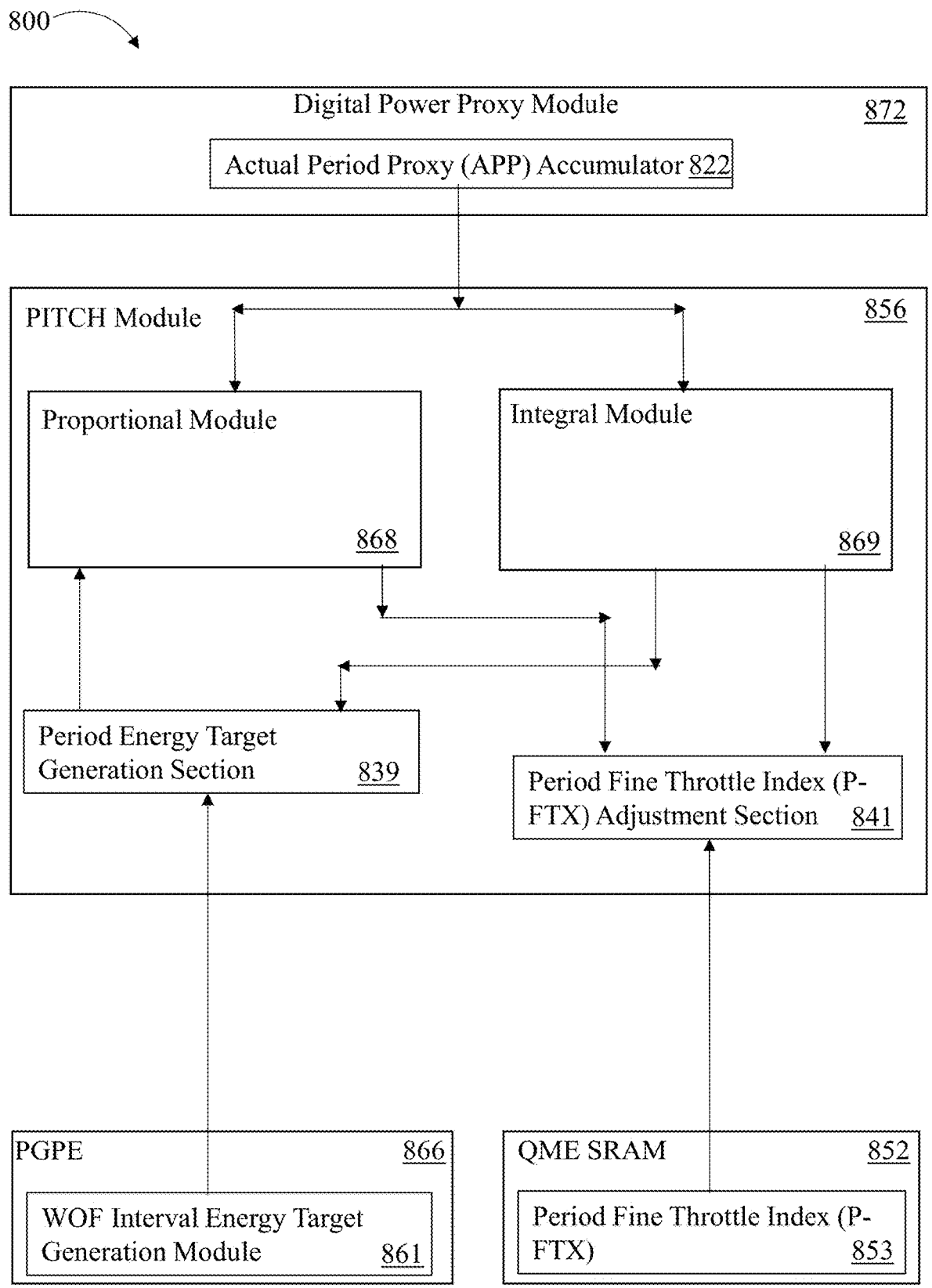
FIG. 8 is block schematic diagram illustrating a high-level view of the PITCH module and supporting components, in accordance with some embodiments of the present disclosure.

Referring to FIG. 8, a block schematic diagram is presented illustrating a high-level view 800 of the PITCH module 856 and supporting components, in accordance with some embodiments of the present disclosure. The digital power proxy module 872 includes the actual period proxy (APP) accumulator 822. The PITCH module 856 and the digital power proxy module 872 are substantially similar to the PITCH module 456-1 and the digital power proxy module 472 shown in FIG. 4.

The PITCH module 856 includes a proportional module 868 and an integral module 869, both communicatively and operably coupled to the APP accumulator 822. The PITCH module 856 also includes a period energy target generation section 839 that is communicatively and operably coupled to both the proportional module 868 and the integral module 869. In addition, the PITCH module 856 includes a period fine throttle index (P-FTX) adjustment section 841 that is communicatively and operably coupled to both the proportional module 868 and the integral module 869. Additional components external to the PITCH module 856 include the PGPE 866 (that is substantially similar to the PGPE 466 shown in FIG. 4) and an embedded WOF interval energy target (WIT) generation module 861. Another component external to the PITCH module 856 includes the QME SRAM 852 (that is substantially similar to the QME SRAM 452 shown in FIG. 4) and the embedded period fine throttle index (P-FTX) 853. The components identified in FIG. 8 and the inter-relationships are discussed further with respect to FIGS. 9 through 13.

Figure 9:
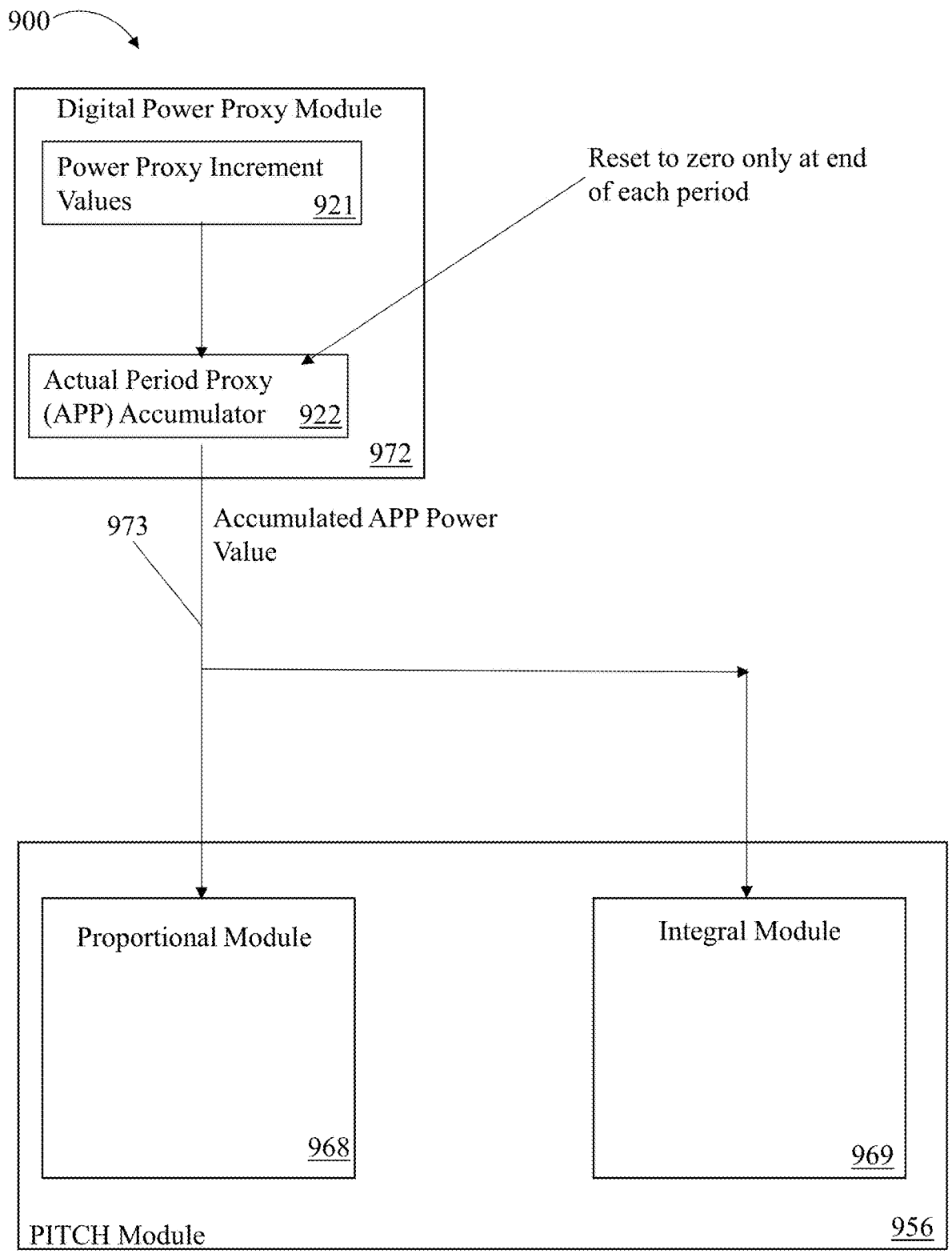
FIG. 9 is block schematic diagram illustrating an operable relationship between a digital power proxy module and the PITCH module, in accordance with some embodiments of the present disclosure.

Referring to FIG. 9, a block schematic diagram is presented illustrating an operable relationship 900 between the digital power proxy module 972 and the PITCH module 956, in accordance with some embodiments of the present disclosure. The digital power proxy module 972, the PITCH module 956, the proportional module 968, and the integral module 969 are substantially similar to the similarly numbered components in FIG. 8. The digital power proxy module 972 generates the power proxy increment values 921.

As described previously herein with respect to FIG. 4, one or more digital power proxy modules 972 (only one shown in FIG. 9) approximate the power the respective processor core (e.g., processor core 436-1 shown in FIG. 4) consumes in real-time for particular events as the power proxy increment values 921. These power proxy increment values 921 are accumulated in the APP accumulator 922. The digital power proxy module 972 transmits the accumulated APP power value 973 representative of the power consumption by the processor core 436-1 to the PITCH module 956. Also, referring to FIG. 7, accordingly, for each period 730, an estimated value of the power consumption by the processor core 436-1 during the period 730, i.e., the accumulated APP power value 973, is generated.

In the final cycle of the respective PITCH period 730, just prior to the subsequent 3-cycle calculation period 740, the present value of the recorded accumulated APP power value 973 for that PITCH period 730 is sampled, i.e., transmitted from the digital power proxy module 492 to the PITCH module 956, and more specifically, to the proportional module 968 and the integral module 969. The value in the APP accumulator 922 is reset to a value of zero in anticipation of collection of the power proxy increment values 921 for the next PITCH period 730. Accordingly, in each PITCH period 730, the energy value reported by the respective digital power proxy module 972 to the PITCH module 956 is the respective accumulated APP power value 973 recorded for that particular period 730.

Figure 10:
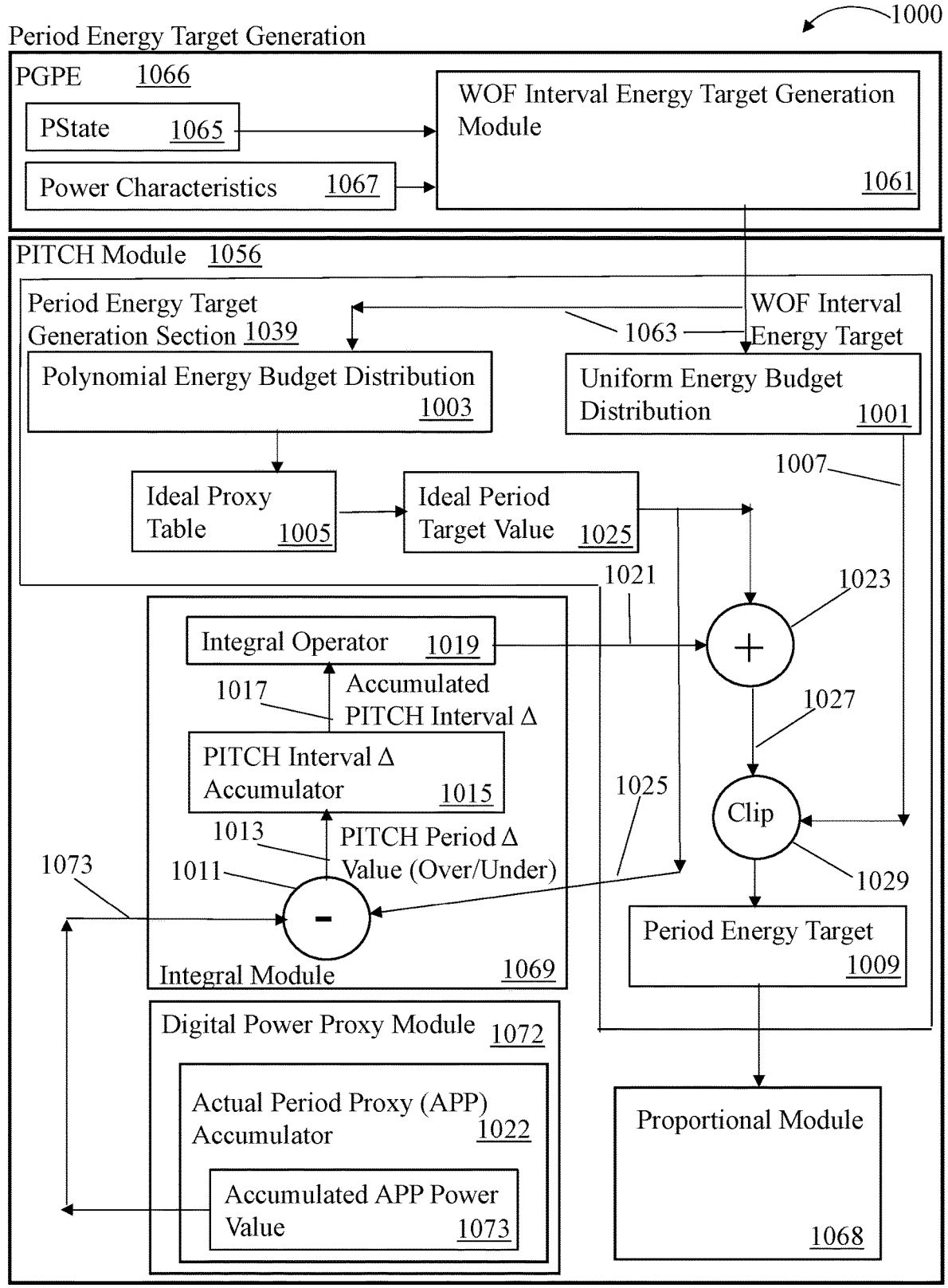
FIG. 10 is a block schematic diagram illustrating the PITCH module's configuration for period energy target generation, in accordance with some embodiments of the present disclosure.

Referring to FIG. 10, a block schematic diagram is presented illustrating the PITCH module's configuration 1000 for period energy target generation, in accordance with some embodiments of the present disclosure. In addition, FIG. 10 illustrates an operable relationship between the PGPE 1066 and the PITCH module 1056 for WOF interval energy target 1063 generation, in accordance with some embodiments of the present disclosure. The period energy target generation section 1039, WOF interval energy target generation module 1061, and PGPE 1066 are substantially similar to the similarly numbered components in FIG. 8. The APP accumulator 1022, PITCH module 1056, proportional module 1068, integral module 1069, digital power proxy module 1072, and accumulated APP power value 1073 are substantially similar to the similarly numbered components in FIG. 9.

As time progresses to the right along the timeline 702 in FIG. 7 from period 0 730-0 to period 1 730-1, the initial period energy target is only valid for the period 0 730-0, and, under most circumstances, the period 1 730-1 will have a different value for the respective period energy target, as will most of the successive periods 730. Specifically, in one or more embodiments, the target energy consumption (period energy target) for each processor core is established based on empirically-derived values for the present and impending instructions. These empirically-derived values are based on at least the number of instructions for a particular task and the computing resources, including the energy consumption, that is necessary for executing the respective instructions. Accordingly, as the anticipated processing loading on the processor core changes, the respective period energy target changes in concert with the anticipated loading.

Continuing to also refer to FIG. 7, at the beginning of each WOF interval 710 (that coincides with the beginning of the PITCH interval 720 (as shown at the first vertical dashed line 714)), each respective processor core is allocated a WOF interval energy target 1063 through the PGPE 1066, i.e., via, the embedded WOF interval energy target generation module 1061. The WOF interval energy target 1063 (sometimes referred to as the WOF interval energy target (WIT) or WOF energy budget) is at least partially based on the real-time power state (PState) 1065 as a function of the present voltage and the present frequency. In addition, WOF interval energy target 1063 is at least partially based on the power characteristics 1067 of the processing system. Such real-time power characteristics include, without limitation, the local core management setting up the WOF interval energy target 1063 and evaluating if the processor core 436-1 hit the power target from the previous WOF interval 710, and determining the value of the difference (sometimes referred to as the error).

The WOF interval energy target generation module 1061 generates the WOF interval energy target 1063 during the 5 μs PGPE sub-interval 712. More specifically, during the 5 μs PGPE calculation sub-interval 712, the OCC module 262 updates the QME 250 (see FIG. 2) with information that includes, without limitation, the previous WOF interval 710 is expired. Such information is used to prompt the WOF interval energy target generation module 1061 to calculate new WOF interval energy targets 1063. The WOF interval energy target 1063 is transmitted to the period energy target generation section 1039.

The period energy target generation section 1039 of the PITCH module 1056 receives the WOF interval energy target 1063 from the PGPE 1066 (via the on-chip register access arbiter module 484). The WOF interval energy target 1063 is the energy target for the full WOF interval 710. The WOF interval energy target 1063 is distributed to each of the 16 periods 730 (64 periods 730 for the respective embodiments). One such distribution is a uniform energy budget distribution 1001 that includes an algorithm for distributing substantially equal energy budget values to each of the 16 (or 64) periods 730, i.e., the WOF interval energy target 1063 divided by either 16 or 64 periods. The resultant output from the uniform energy budget distribution 1001 is a uniform period energy distribution 1007.

In contrast, a polynomial energy budget distribution 1003 that facilitates a "bursty" workload, i.e., a core workload including bursts of instructions as compared to a uniform transmission of instructions to the respective cores. In at least some embodiments, the PITCH module 1056 includes sufficient logic to facilitate a predetermined user selection for when the polynomial energy budget distribution 1003 or the uniform energy budget distribution 1001. For the polynomial energy budget distribution 1003, an ideal proxy table 1005 (resident in the PITCH module 1056) is accessed to select the energy budget for each period. The ideal proxy table 1005 is at least partially based on one or more polynomial algorithms that are previously determined and in at least one embodiment, and without limitation, the period energy budgets are [(2*WOF interval energy target 1063)/16] for the first four periods, [(WOF interval energy target 1063)/16] for the fifth through eighth periods, [(WOF interval energy target 1063)/2] for the ninth through twelfth periods, and [(WOF interval energy target 1063)/2)/2] for the thirteenth through sixteenth periods. In some embodiments, any polynomial algorithms that enable operation of the PITCH module 1056 as described herein are used. The resultant selection from the ideal proxy table 1005 based on the present period 730 is an ideal period target value 1025.

As described for FIG. 9, for each period 730, the power proxy increment values 921 are accumulated in the APP accumulator 1022. The digital power proxy module 1072 transmits the accumulated APP power value 1073 representative of the power consumption by the processor core 436-1 for that particular period 730 to the integral module 1069 in the PITCH module 1056. The accumulated APP power value 1073 is compared through a subtraction operator 1011 to the energy budget value for that particular period, i.e., the ideal period value 1025, on a period-by-period basis. The difference between the two values, i.e., a PITCH period Δ value (over/under) 1013 is transmitted to a PITCH interval Δ accumulator 1015, where the PITCH period Δ values 1013 are accumulated to generate an accumulated PITCH interval Δ value 1017. The respective processor core's period energy value (based on the sum of all activity in the respective period), i.e., the PITCH period Δ value (over/under) 1013 for that PITCH period 730 is compared to the respective ideal period value 1025. If the energy consumed by the processor core, as represented by the accumulated APP power value 1073, is less than (under) the ideal period value 1025, the under value is an indication that less throttling may be required. An under value for a PITCH period Δ value 1013 is generated and accumulated in the PITCH interval Δ accumulator 1015. If the energy consumed by the processor core, as represented by the accumulated APP power value 1073, is greater than (over) the ideal period value 1025, the over value is an indication that more throttling may be required. An over value for the PITCH period Δ value 1013 is generated and accumulated in the PITCH interval Δ accumulator 1015.

At the end of the respective period 730, after the accumulated APP power value 1073 is transmitted, the APP accumulator 1022 is reset to zero. As each subsequent period 730 concludes, the respective PITCH period Δ value 1013 is accumulated in the PITCH interval accumulator 1015 until the PITCH interval 720 is completed at the end of the period 15 730-15. The accumulated PITCH interval Δ value 1017 (the total error for all of the periods 730 during the respective WOF interval 710) is transmitted to an integral operator 1019. The output of the integration operations in the integral operator is an integrated PITCH interval Δ value 1021 that is transmitted to a summation operator 1023.

The ideal period target values 1025 are transmitted to the summation operator 1023, where the integrated PITCH interval Δ 1021 is added thereto. The first ideal period target value 1925 associated with the first period 730 of the PITCH interval 720 does not include the integrated PITCH interval Δ 1021 due to no previous periods 730. The resultant adjusted ideal target value 1027 is transmitted to a clipping operator 1029, where minimum and maximum clipping values established for facilitating the fine tuning of the throttle state adjustments are made. Similarly, the uniform period energy distribution 1007 are transmitted to the clipping operator 1029. The output of the clipping operator 1029 is the period energy target 1009 for the present period 730. The period energy target 1009 is transmitted to the proportional module 1068 as will be discussed further with respect to FIG. 12. Accordingly, on period-to-period basis, as the accumulated APP power value 1073 changes, the period energy target 1009 changes.

As the process described with respect to FIG. 10 is executed, on a period-to-period basis, as the period energy targets 1009 are updated on an iterative basis based on the difference between the period energy targets 1009 and the measured energy consumption (i.e., the accumulated APP power value 1073) for the respective periods, the total energy consumption for the PITCH interval will approach, i.e., converge with the WOF interval energy target 1063. Accordingly, as each respective period is concluded, a total period energy consumption of the processor core will converge with the WOF interval energy target 1063. Moreover, such converging of the respective total period energy consumption of each processor core with the respective interval energy target is achieved independently for each processor core. In addition, with respect to FIG. 13, the convergence is further enhanced through coordinating the respective period energy targets and the respective processor core throttling states to maximize processing activity of the processor cores (as measured through the respective energy consumption) while minimizing throttling of the processor cores.

Figure 11:
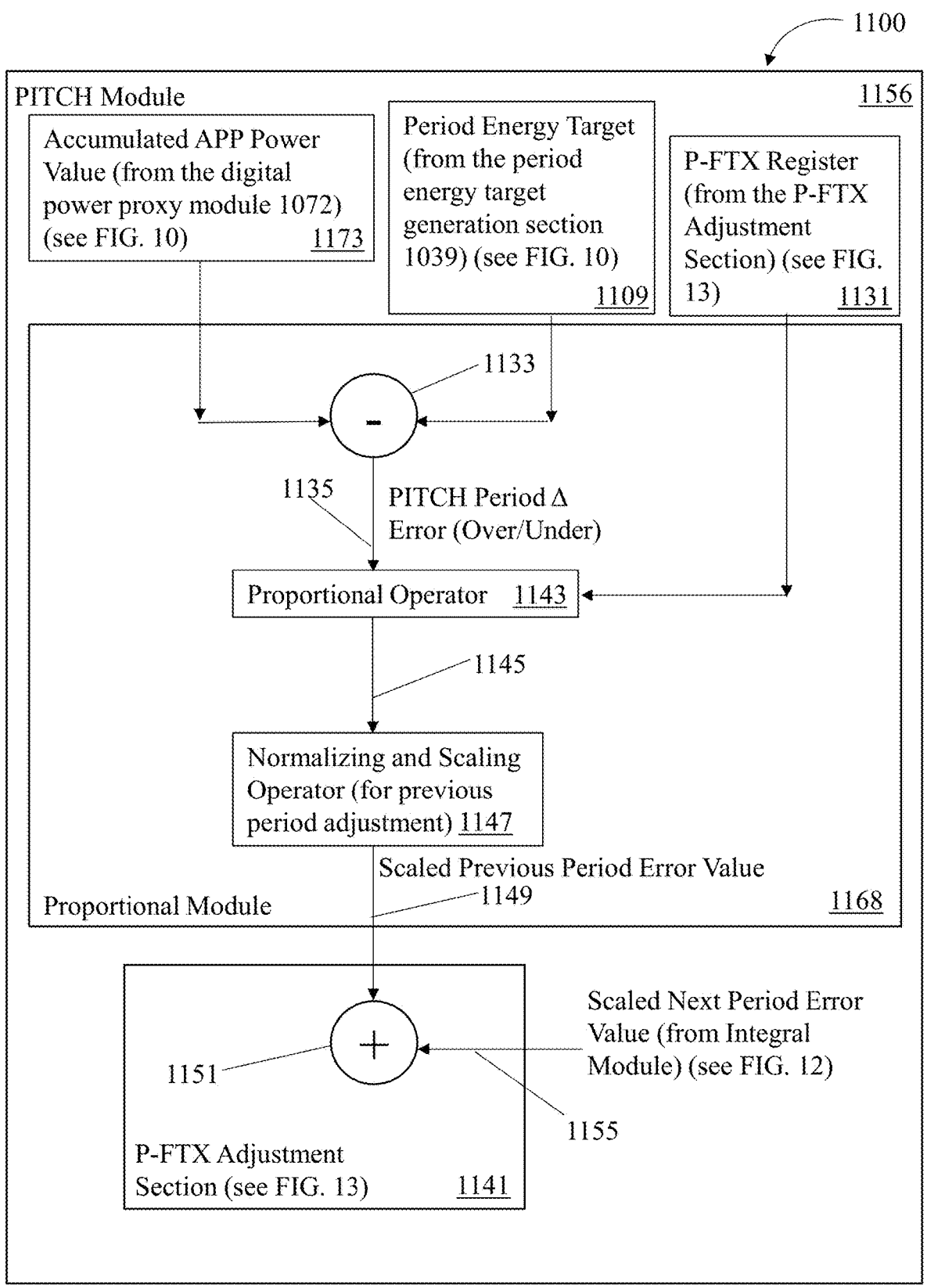
FIG. 11 is a block schematic diagram illustrating the proportional module in the PITCH module, in accordance with some embodiments of the present disclosure.

Referring to FIG. 11, a block schematic diagram is presented illustrating the proportional module 1168 in the PITCH module 1156, in accordance with some embodiments of the present disclosure. The period energy target 1109, PITCH period Δ value (over/under) 1113, PITCH module 1156, proportional module 1168, and accumulated APP power value 1173 are substantially similar to the similarly numbered components in FIG. 10. The accumulated APP power value 1173 (from the digital power proxy module 1072, as shown in FIG. 10) and the period energy target 1009 (from the period energy target generation section 1039, shown in FIG. 10) are compared at a subtraction operator 1133. The resultant PITCH period Δ error (over/under) 1135 is distinguished from the PITCH period Δ value (over/under) 1013 generated in the integral module 1069 as shown in FIG. 10. The PITCH period Δ error (over/under) 1135 is transmitted to a proportional operator 1143 that executes a proportional adjustment based on the previous period's 730 energy budget (period energy target 1109) and the present value of the period fine throttle index (P-FTX) that is resident in a P-FTX register 1131 within the period fine throttle index (P-FTX) adjustment section 841 (see FIG. 8, and described further with respect to FIG. 13). The output 1145 of the proportional operator 1143 is transmitted to a normalizing and scaling operator 1147 for making an adjustment based on the previous period 730 to generate a scaled previous period error value 1149 based on the present level of throttling and the previous period's proportional adjustment to the PITCH period Δ value (over/under) 1113. The scaled previous error value 1149 is generated during the 3-cycle calculation period 740 (see FIG. 7) at the end of each period 730 and is transmitted to a summation operator 1151 in the P-FTX adjustment section 1141 to be summed with a scaled next period error value 1155 received from the integral module 1069 (see FIG. 10) and described further with respect to FIG. 12. The functions described for the proportional module 1168 are configured to be executed during the end of the last period, i.e., the period 730-15 in the respective PITCH interval 720.

Figure 12:
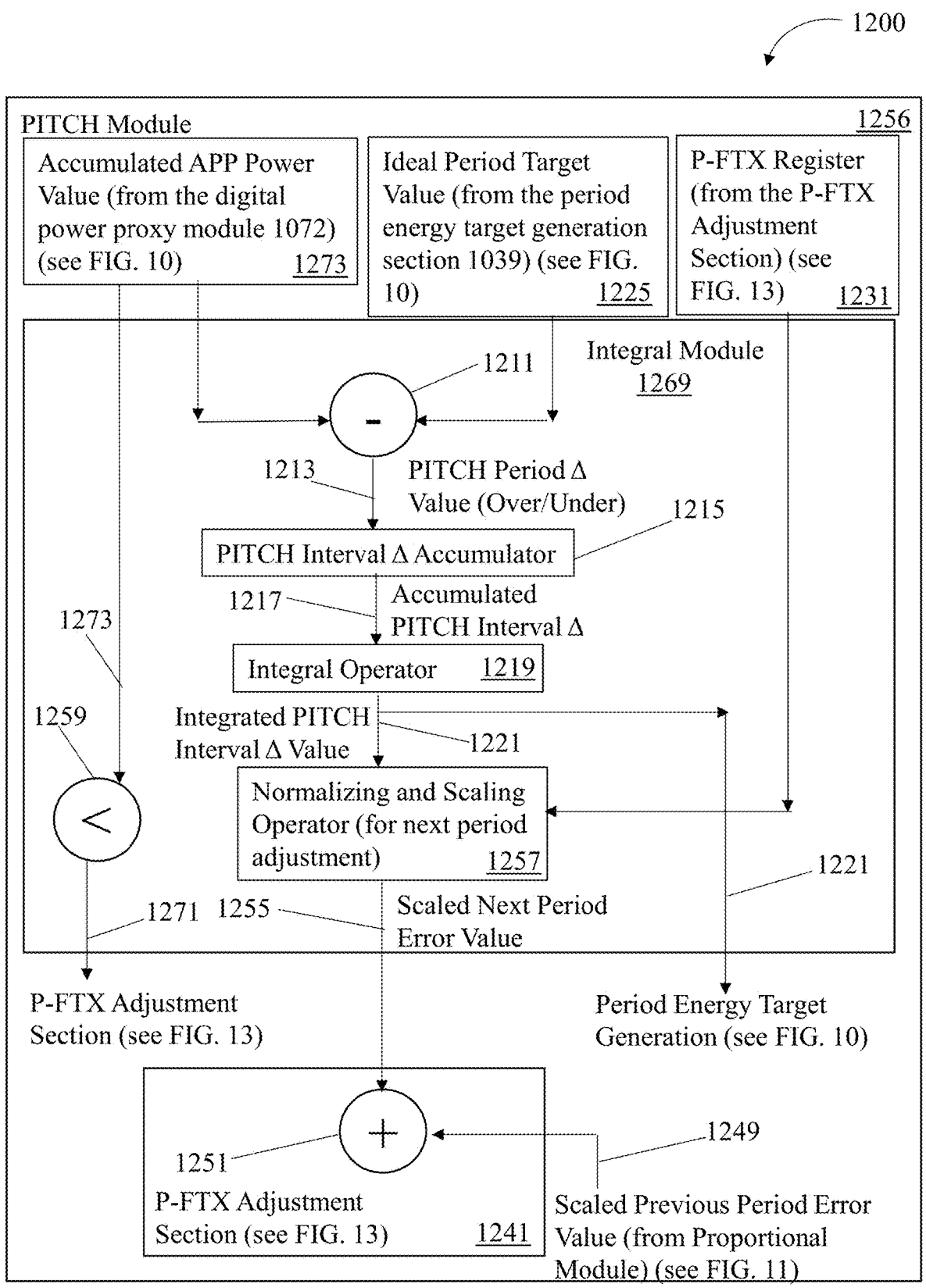
FIG. 12 is a block schematic diagram illustrating the integral module in the PITCH module, in accordance with some embodiments of the present disclosure.

Referring to FIG. 12, a block schematic diagram is presented illustrating the integral module 1269 in the PITCH module 1256, in accordance with some embodiments of the present disclosure. The subtraction operator 1211, PITCH Period Δ Value (Over/Under) 1213, PITCH Interval Δ Accumulator 1215, accumulated PITCH interval Δ value 1217, integral operator 1219, integrated PITCH interval Δ value 1221, ideal period target value 1225, and integral module 1269 are substantially similar to the similarly numbered components in FIG. 10. The P-FTX register 1231, P-FTX adjustment section 1241, scaled previous period error value 1249, summation operator 1251, and accumulated APP power value 1273 are substantially similar to the similarly numbered components in FIG. 11. The accumulated APP power value 1173 (from the digital power proxy module 1072, as shown in FIG. 10) and the ideal period target value 1225 (from the period energy target generation section 1039, shown in FIG. 10) are compared at a subtraction operator 1211. The resultant PITCH Period Δ Value (Over/Under) 1213 is distinguished from the PITCH period Δ error (over/under) 1135 generated in the proportional module 1168 as shown in FIG. 11. The PITCH Period Δ Value (Over/Under) 1213 is transmitted to the PITCH interval Δ accumulator 1215, where the PITCH period Δ values 1213 are accumulated to generate the accumulated PITCH interval Δ value 1217. The functions associated with filling the PITCH interval Δ accumulator 1215 to generate the accumulated PITCH interval Δ value 1217 occur during the end of each period, i.e., the period 730-15 in the respective PITCH interval 720.

The accumulated PITCH interval Δ value 1217 (the total error for all of the periods 730 during the respective WOF interval 710) is transmitted to the integral operator 1219. The output of the integration operations in the integral operator 1219 is an integrated PITCH interval Δ value 1221 that is transmitted to a normalizing and scaling operator 1257. The normalizing and scaling operator 1257 is configured to generate a scaled next period error value 1255 based on the present level of throttling. The present level of throttling is captured from the present value of the period fine throttle index (P-FTX) that is resident in the P-FTX register 1231 that is within the period fine throttle index (P-FTX) adjustment section 841 (see FIG. 8, and described further with respect to FIG. 13). The scaled next period error value 1255 is generated during the 3-cycle calculation period 740 at the end of each period 730 (see FIG. 7) and is transmitted to the summation operator 1251 in the P-FTX adjustment section 1241 to be summed with the scaled previous period error value 1249 received from the proportional module 1168 (see FIG. 11). The functions associated with generating the integrated PITCH interval Δ value 1221 and the scaled next period error value 1255 after generating the accumulated PITCH interval Δ value 1217 occur during the beginning of the next successive period 730 after the previous period 730.

Figure 13:
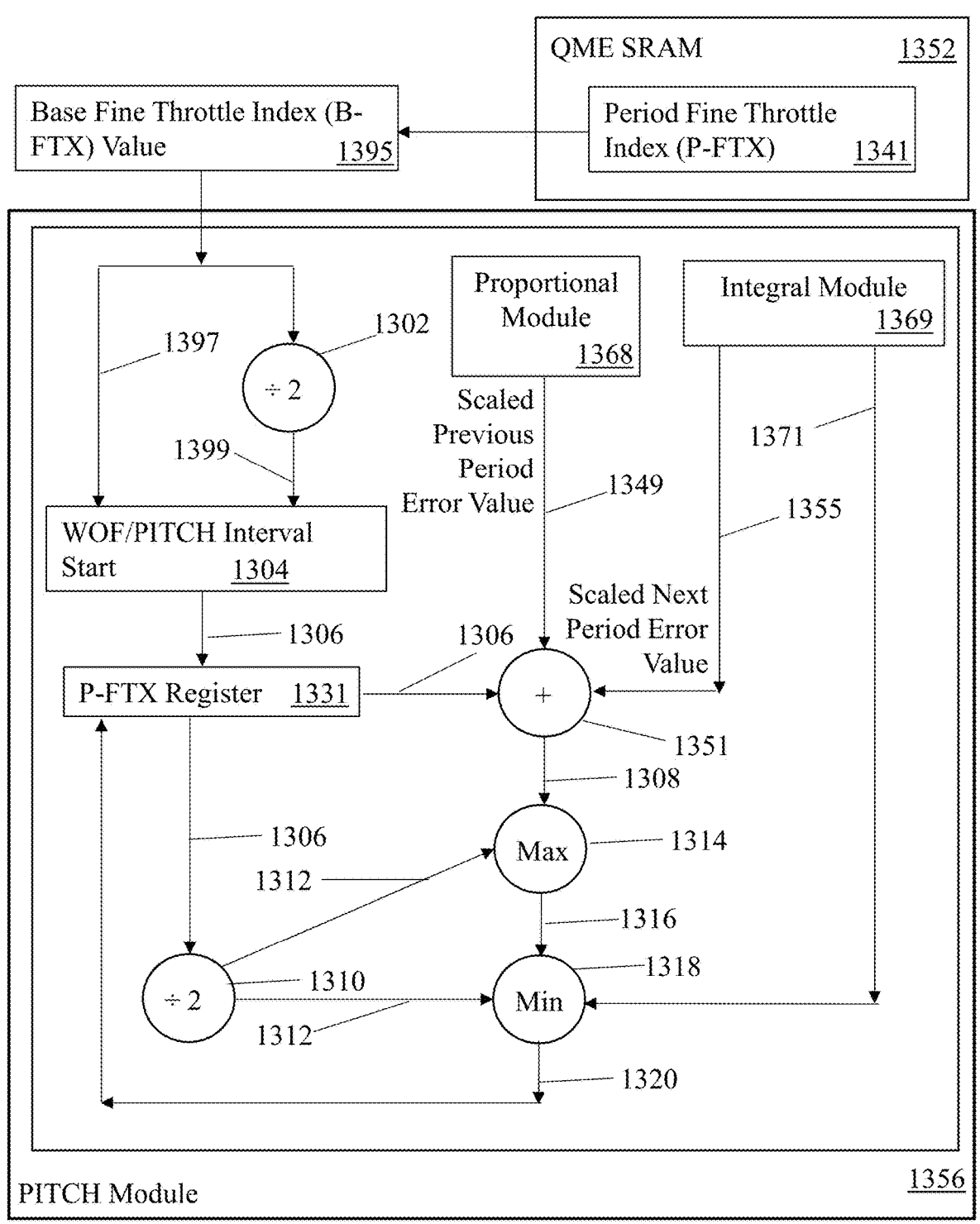
FIG. 13 is a block schematic diagram illustrating the PITCH module's configuration for period fine throttle index (P-FTX) adjustment, in accordance with some embodiments of the present disclosure.

In addition, the integral module 1269 includes a less than operator 1259 that is configured to generate and transmit a minimum indicator 1271 for the accumulated APP power values 1273 to the P-FTX adjustment section 1241 (see FIG. 13). Moreover, the integral operator 1219 is configured to transmit the integrated PITCH interval Δ value 1221 to the summation operator 1023 as described with respect to FIG. 10.

Referring to FIG. 13, a block schematic diagram illustrating the PITCH module's 1356 configuration 1300 for period fine throttle index (P-FTX) adjustment, in accordance with some embodiments of the present disclosure. The QME SRAM 1352, period fine throttle index (P-FTX) adjustment section 1341, and period fine throttle index (P-FTX) 1353 are substantially similar to the similarly numbered components in FIG. 8. The proportional module 1368 and scaled previous period error value 1349 are substantially similar to the similarly numbered components in FIG. 11. The integral module 1369 and scaled next period error value 1355 are substantially similar to the similarly numbered components in FIG. 12. The P-FTX register 1331 is substantially similar to the P-FTX register 1121 (shown in FIG. 11) and the P-FTX register 1231 (shown in FIG. 12). The summation operator 1351 is substantially similar to the summation operator 1151 (shown in FIG. 11) and the summation operator 1251 (shown in FIG. 12). Also referring to FIG. 7, as previously described herein, at the beginning of each WOF interval 710 that coincides with the beginning of the PITCH interval 720, including the PITCH period 0 730-0 an initial core throttle state is generated. Similarly, at the beginning of each subsequent period 730-1 through 730-15, the period throttle state is updated and applied to the core through the respective period. Accordingly, such throttle states are generated through the period fine throttle index (P-FTX) adjustment section 1341.

At the beginning of each WOF interval 710 that coincides with the beginning of the PITCH interval 720, a base fine throttle index (B-FTX) value 1395 is collected from the period fine throttle index (P-FTX) 1341 resident within the QME SRAM 1352 through the DTC sequencer module 478 (shown in FIG. 4). The B-FTX value 1395 is selected at least partially as a function of the WOF interval energy target 1063 that is generated as described with respect to FIG. 10. The B-FTX value 1395 is used to generate two values, i.e., a full B-FTX value 1397 and a half-B-FTX value 1399 through a first ½-division operator 1302. The selection of the full B-FTX value 1397 is at least partially based on the uniform energy budget distribution 1001 being selected (see FIG. 10). Similarly, the selection of the half-B-FTX value 1399 is at least partially based on the polynomial energy budget distribution 1003 being selected (see FIG. 10). Upon a WOF/PITCH interval start 1304, the selected B-FTX value 1306 is transmitted to the P-FTX register 1331. Accordingly, the B-FTX values 1306 are only used at the beginning of a new WOF/PITCH interval.

As previously described for FIG. 11, the B-FTX value 1306 is transmitted to the proportional operator 1143 (not shown in FIG. 13) in the proportional module 1168. Also, as previously described for FIG. 12, the B-FTX value 1306 is transmitted to the normalizing and scaling operator 1257 in the integral module 1269 (not shown in FIG. 13). In addition, the B-FTX value 1306 is transmitted to the summation operator 1351 for summation with the scaled previous period error value 1349 transmitted from the proportional module 1368 and the scaled next period error value 1359 transmitted from the integral module 1369. The scaled previous period error value 1349 will be zero for the first period 730 of the PITCH interval and the scaled next period error value 1359 will be zeroed for the $15^{th}$ (i.e., last) period 730 of the PITCH interval 720. Such summation operation generates a summation value 1308 that is based on an adjustment of the value that will be used for the processor core throttle state for the previous period 730 and the next (or present) period 730, thereby regulating the throttle setting at least partially as a function of the previous and present periods 730. Accordingly, at the end of the respective WOF interval 710, the values for the scaled previous period error value 1349 and the scaled next period error value 1359 are zeroed such that for the next WOF interval 710 will use a new B-FTX value 1395 selected at least partially as a function of the new WOF interval energy target 1063 that is generated as described with respect to FIG. 10.

The B-FTX value 1306 is transmitted to a second ½-division operator 1310 to generate a half-B-FTX value 1312 to a maximum operator 1314. The maximum operator 1314 is also configured to receive the summation value 1308. The maximum operator 1314 is configured to reduce a potential for accelerating the throttling setting by more than a factor of 2 for each period, where the lowest (floor) value would be (P-FTX)/2, i.e., the value generated by the second ½-division operator 1310. The resultant FTX value 1316 is transmitted to a minimum operator 1318 that also receives the half-B-FTX value 1312. The minimum operator 1318 is configured to receive an indication of the value of the two B-FTX values 1312 and 1316 that should be selected based on the minimum indicator 1271 for the accumulated APP power values 1273 received from the less than operator 1259 (see FIG. 12) in the integral module 1369. The resultant updated B-FTX value 1320, i.e., the updated P-FTX value 1320 is transmitted to the P-FTX register 1331 for application in the next period. As the process proceeds from period-to-period through the respective PITCH interval, for each period the P-FTX register 1331 will be updated with the most recent P-FTX value 1320. Accordingly, for each new PITCH period, an adjusted P-FTX value 1320 representative of a processor core throttle state will be generated and applied to the core throttling activity.

In addition, with respect to FIG. 10, as each respective period is concluded, a total period energy consumption of the processor core will converge with the WOF interval energy target 1063. The convergence is further enhanced through coordinating the respective period energy targets and the respective processor core throttling states to maximize processing activity of the processor cores (as measured through the respective energy consumption) while minimizing throttling of the processor cores.

Figure 14:
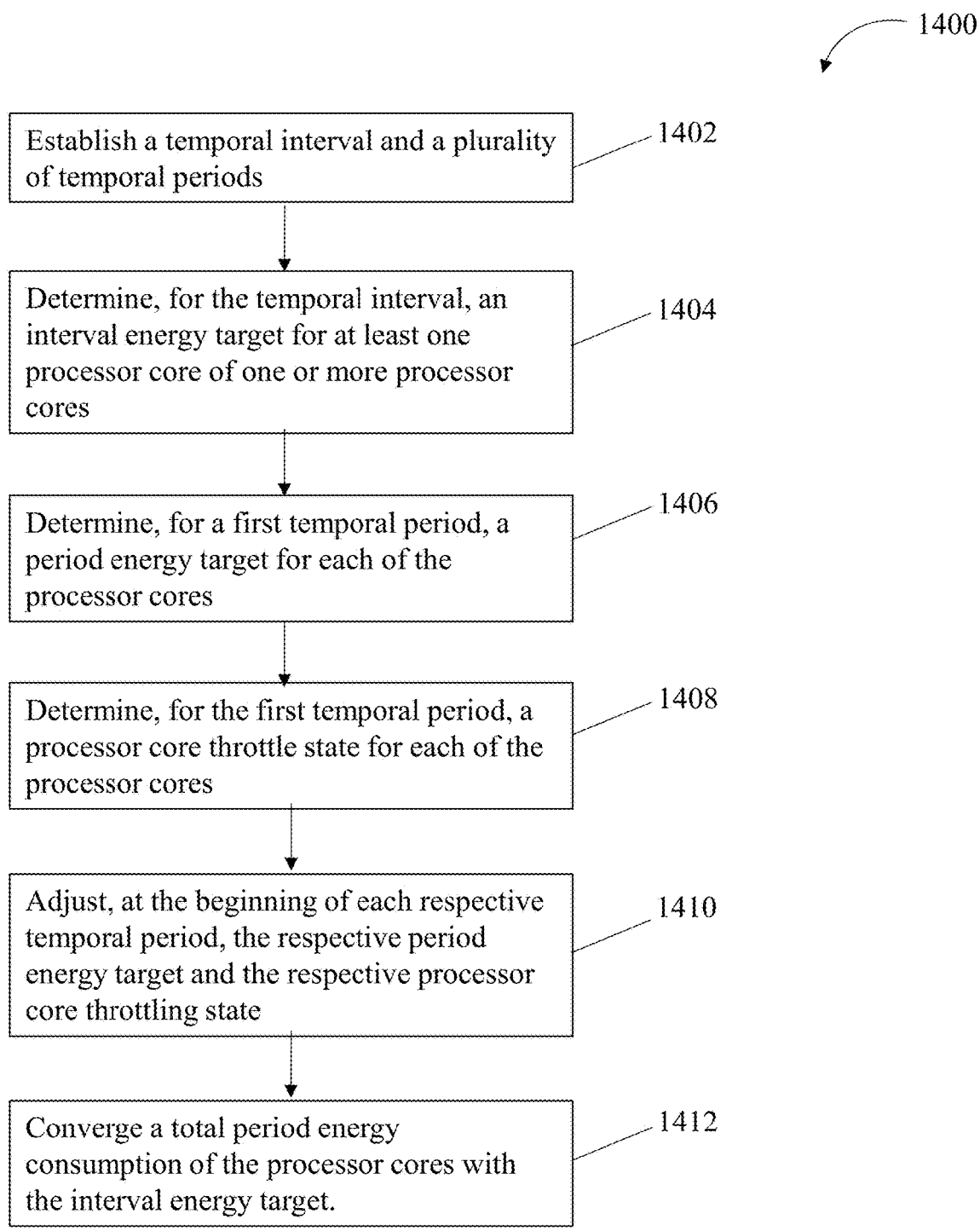
FIG. 14 is a flowchart illustrating a process for energy management of the cores in a multicore processing device, in accordance with some embodiments of the present disclosure.

Referring to FIG. 14, a flowchart is provided illustrating a process 1400 for energy management of the processor cores in a multicore processing device, in accordance with some embodiments of the present disclosure. The process 140o includes establishing 1402 a temporal interval that includes a plurality of temporal periods. Referring to FIG. 7, a WOF interval 710, a respective PITCH interval, and the accompanying PITCH periods 730-0 through 730 are created through the PGPE (PState general purpose engine) 266 (shown in FIG. 2). The process 1400 also includes determining 1404, for the WOF interval 710, an interval energy target for at least one processor core of one or more processor cores. Continuing to refer to FIG. 7, at the beginning of each WOF interval 710 (that coincides with the beginning of the PITCH interval 720), each respective processor core (e.g., processor cores 336-1 through 336-4 (see FIG. 3) is allocated a WOF interval energy target 1063 through the embedded WOF interval energy target generation module 1061 of the PGPE 1066, where the WOF interval energy target generation module 1061 generates the WOF interval energy target 1063 during the 5 μs PGPE sub-interval 712.

The process 1400 further includes determining 1406, for a first temporal period, a period energy target for each of the processor cores. Referring to FIG. 10, the period energy target generation section 1039 of the PITCH module 1056 receives the WOF interval energy target 1063 from the PGPE 1066 (via the on-chip register access arbiter module 484). The WOF interval energy target 1063 is the energy target for the full WOF interval 710. The WOF interval energy target 1063 is distributed to each of the 16 periods 730 (64 periods 730 for the respective embodiments) through one of a uniform distribution and a polynomial distribution. Moreover, the process 1400 includes determining 1408, for the first temporal period, a processor core throttle state for each of the processor cores. Referring to FIG. 13, at the beginning of each WOF interval 710 that coincides with the beginning of the PITCH interval 720, a base fine throttle index (B-FTX) value 1395 is collected from the period fine throttle index (P-FTX) 1341 resident within the QME SRAM 1352 through the on-line register access features described herein. The B-FTX value 1395 is selected at least partially as a function of the WOF interval energy target 1063 that is generated as described with respect to FIG. 10. Upon a WOF/PITCH interval start 1304, the selected B-FTX value 1306 is transmitted to the P-FTX register 1331. Accordingly, the B-FTX values 1306 are only used at the beginning of a new WOF/PITCH interval.

The process 1400 also includes adjusting 1410, at the beginning of each successive temporal period, the respective period energy target and the respective processor core throttling state. Referring to FIG. 10, on period-to-period basis, as the accumulated APP power value 1073 changes, the period energy target 1009 changes. Referring to FIG. 13, as the process 1400 proceeds from period-to-period through the respective PITCH interval, for each period the P-FTX register 1331 will be updated with the most recent P-FTX value 1320. Accordingly, for each new PITCH period, an adjusted P-FTX value 1320 representative of a processor core throttle state will be generated and applied to the core throttling activity.

Moreover, the process 1400 includes converging 1412, as each respective temporal period of the plurality of temporal periods is concluded within a PITCH interval, a total period energy consumption of the at least one processor core of the one or more processor cores with the interval energy target. As the process described with respect to FIG. 10 is executed, on a period-to-period basis, as the period energy targets 1009 are updated on an iterative basis based on the difference between the period energy targets 1009 and the measured energy consumption (i.e., the accumulated APP power value 1073) for the respective periods, the total energy consumption for the PITCH interval will approach the WOF interval energy target 1063. Accordingly, as each respective period is concluded, a total period energy consumption of the processor core will converge with the WOF interval energy target 1063.

The system and method as disclosed and described herein are configured for energy management of one or more processor cores, and the embodiments disclosed herein provide an improvement to computer technology. For example, the embodiments described herein use a hardware-based proportion-integral control loop that reduces need for further straining the resources of the microarchitectural microprocessor hardware. The subject hardware control loop automatically learns and adjusts to changing workloads, where fine control of the throttling and processing activity are managed on a sub-interval, i.e., period basis through modulating the periods' energy targets and core throttling activity. Moreover, the control loop is configured for coordinating the respective period energy targets and the respective processor core throttling states to maximize processing activity of the at processor cores while minimizing throttling of the more processor cores. In addition, the coordinated management of the period energy targets and processor core throttling facilitates operating the core at a fixed frequency, thereby further maximizing the processing activity.

On addition, further improvement of computer technology is achieved through facilitating convergence of a total energy consumption of the processor core with an interval target on a period-by-period basis. Moreover, such converging of the respective total period energy consumption of each processor core with the respective interval energy target is achieved independently for each processor core. In addition, the convergence is further enhanced through coordinating the respective period energy targets and the respective processor core throttling states to maximize processing activity of the processor cores (as measured through the respective energy consumption) while minimizing throttling of the processor cores.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer programs products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer system for managing energy consumption of one or more processor cores in a multicore processing device comprising:
    a power state general purpose engine (PGPE) operably coupled to the one or more processor cores, the PGPE is configured to:
        establish a temporal interval; and
        establish a plurality of temporal periods within the temporal interval;
    a hardware-based control loop operably coupled to the one or more processor cores and the PGPE, the hardware-based control loop is configured to:
        determine, for the temporal interval, an interval energy target for the at least one processor core of the one or more processor cores;
        determine, for a first temporal period of the plurality of temporal periods, a period energy target for the at least one processor core of the one or more processor cores;
        determine, for the first temporal period of the plurality of temporal periods, a processor core throttling state for the at least one processor core of the one or more processor cores;
        adjust, at a beginning of each successive temporal period of the plurality of temporal periods, the respective period energy target and the respective processor core throttling state; and
        converge, subject to the adjustment, as each respective temporal period of the plurality of temporal periods is concluded, a total period energy consumption of the at least one processor core of the one or more processor cores with the interval energy target.

2. The system of claim 1, wherein the hardware-based control loop is further configured to:
    coordinate the respective period energy targets and the respective processor core throttle states to maximize processing activity of the at least one processor core of the one or more processor cores while minimizing throttling of the at least one processor core of the one or more processor cores.

3. The system of claim 2, further comprising:
    a digital phase-locked loop (DPLL) module configured to:
        maintain a substantially fixed clock frequency on the at least one processor core of the one or more processor cores.

4. The system of claim 1, further comprising:
    a quad management engine QME comprising one or more QME static random access memories (SRAM), the QME operably coupled to the one or more processor cores and the hardware-based control loop, wherein the QME SRAM is configured to maintain a table of processor throttling states resident thereon, the table of processor throttling states being empirically generated, wherein at least a portion of the table of processor core throttling states defines a substantially linear relationship with respect to associated power consumption values of the at least one processor core of the one or more processor cores; and
    the hardware-based control loop is further configured to modulate the respective processor core throttling state to configure the at least one processor core of the one or more processor cores to consume the power value associated with the processor core throttling state.

5. The system of claim 1, wherein the hardware-based control loop is further configured to:
    converge the respective total period energy consumption of each processor core of the one or more processor cores with the respective interval energy target of each processor core of the one or more processor cores independently.

6. The system of claim 1, wherein the hardware-based control loop is further configured to:
distribute the interval energy target for the at least one processor core of the one or more processor cores uniformly to each temporal period of the plurality of temporal periods within the temporal interval; and
distribute the interval energy target for the at least one processor core of the one or more processor cores polynomially to each temporal period of the plurality of temporal periods within the temporal interval.

7. The system of claim 1, further comprising:
one or more power proxy modules operably coupled to the hardware-based control loop, the one or more power proxy modules are configured to record, for each temporal period of the plurality of temporal periods, a proxy energy consumption value for the least one processor core of the one or more processor cores;
the hardware-based control loop further configured to:
compare, for each temporal period of the plurality of temporal periods, the recorded proxy energy consumption value with the respective period energy target, thereby determine an energy delta value for the respective temporal period of the plurality of temporal periods; and
determine, subject to the respective energy delta, for each temporal period of the plurality of temporal periods, a respective adjusted period energy target and a respective adjusted processor core throttling state.

8. The system of claim 7, wherein the hardware-based control loop is further configured to:
determine the respective proxy energy consumption value is less than the respective period energy target for the first temporal period of the plurality of temporal periods;
increase the period energy target for a second temporal period of the plurality of temporal periods; and
increase the processor core throttling state for the second temporal period of the plurality of temporal periods.

9. The system of claim 7, wherein the hardware-based control loop is further configured to:
determine the respective proxy energy consumption value is greater than the respective period energy target for the first temporal period of the plurality of temporal periods;
decrease the period energy target for the second temporal period of the plurality of temporal periods; and
decrease the processor core throttling state for the second temporal period of the plurality of temporal periods.

10. The system of claim 7, wherein the hardware-based control loop is further configured to:
accumulate the energy delta values for all temporal periods of the plurality of temporal periods, thereby generating an accumulated energy delta value for a first temporal interval; and
apply the accumulated energy delta value for the first temporal interval to an interval energy target for a second temporal interval.

11. A computer-implemented method for managing energy consumption of one or more processor cores comprising:
establishing a temporal interval, wherein the temporal interval includes a plurality of temporal periods;
determining, for the temporal interval, an interval energy target for at least one processor core of the one or more processor cores;
determining, for a first temporal period of the plurality of temporal periods, a period energy target for the least one processor core of the one or more processor cores;
determining, for the first temporal period of the plurality of temporal periods, a processor core throttle stating for the at least one processor core of the one or more processor cores;
adjusting, at a beginning of each successive temporal period of the plurality of temporal periods, the respective period energy target and the respective processor core throttling state; and
converging, subject to the adjusting, as each respective temporal period of the plurality of temporal periods is concluded, a total period energy consumption of the at least one processor core of the one or more processor cores with the interval energy target.

12. The method of claim 11, wherein the converging the total period energy consumption of the at least one processor core of the one or more processor cores with the interval energy target comprises:
coordinating the respective period energy targets and the respective processor core throttling states to maximize processing activity of the at least one processor core of the one or more processor cores while minimizing throttling of the at least one processor core of the one or more processor cores.

13. The method of claim 12, further comprising:
maintaining a substantially fixed clock frequency on the at least one processor core of the one or more processor cores.

14. The method of claim 11, wherein the adjusting the respective processor core throttling state comprises:
empirically generating a table of processor core throttling states, wherein at least a portion of the table of processor core throttling states defines a substantially linear relationship with respect to associated power consumption values of the at least one processor core of the one or more processor cores; and
modulating the respective processor core throttling state to configure the at least one processor core of the one or more processor cores to consume the power value associated with the processor core throttling state.

15. The method of claim 11, wherein the converging the total period energy consumption of the at least one processor core of the one or more processor cores with the interval energy target comprises:
converging the respective total period energy consumption of each processor core of the one or more processor cores with the respective interval energy target of each processor core of the one or more processor cores independently.

16. The method of claim 11, wherein the determining a period energy target for the least one processor core of the one or more processor cores comprises one of:
distributing the interval energy target for the at least one processor core of the one or more processor cores uniformly to each temporal period of the plurality of temporal periods within the temporal interval; and
distributing the interval energy target for the at least one processor core of the one or more processor cores polynomially to each temporal period of the plurality of temporal periods within the temporal interval.

17. The method of claim 11, wherein the adjusting the respective period energy target and the respective processor core throttling state comprises:
- recording, for each temporal period of the plurality of temporal periods, a proxy energy consumption value for the least one processor core of the one or more processor cores;
- comparing, for each temporal period of the plurality of temporal periods, the recorded proxy energy consumption value with the respective period energy target, thereby determining an energy delta value for the respective temporal period of the plurality of temporal periods; and
- determining, subject to the respective energy delta, for each temporal period of the plurality of temporal periods, a respective adjusted period energy target and a respective adjusted processor core throttling state.

18. The method of claim 17, wherein the determining the respective adjusted period energy target and the respective adjusted processor core throttling state comprises:
- determining the respective proxy energy consumption value is less than the respective period energy target for the first temporal period of the plurality of temporal periods;
- increasing the period energy target for a second temporal period of the plurality of temporal periods; and
- increasing the processor core throttling state for the second temporal period of the plurality of temporal periods.

19. The method of claim 17, wherein the determining the respective adjusted period energy target and the respective adjusted processor core throttling state comprises:
- determining the respective proxy energy consumption value is greater than the respective period energy target for the first temporal period of the plurality of temporal periods;
- decreasing the period energy target for the second temporal period of the plurality of temporal periods; and
- decreasing the processor core throttling state for the second temporal period of the plurality of temporal periods.

20. The method of claim 17, further comprising:
- accumulating the energy delta values for all temporal periods of the plurality of temporal periods, thereby generating an accumulated energy delta value for a first temporal interval; and
- applying the accumulated energy delta value for the first temporal interval to an interval energy target for a second temporal interval.

* * * * *